(12) United States Patent
Banister et al.

(10) Patent No.: US 7,293,065 B2
(45) Date of Patent: Nov. 6, 2007

(54) METHOD OF ELECTRONIC MESSAGE DELIVERY WITH PENALTIES FOR UNSOLICITED MESSAGES

(75) Inventors: Scott Banister, Pacifica, CA (US); Patrick R. Peterson, San Francisco, CA (US); James Moore, Menlo Park, CA (US)

(73) Assignee: Return Path, New York, NY (US)

( * ) Notice: Subject to any disclaimer, the term of this patent is extended or adjusted under 35 U.S.C. 154(b) by 323 days.

(21) Appl. No.: 10/717,441

(22) Filed: Nov. 18, 2003
(Under 37 CFR 1.47)

(65) Prior Publication Data

US 2004/0260778 A1 Dec. 23, 2004

Related U.S. Application Data

(60) Provisional application No. 60/482,883, filed on Jun. 25, 2003, provisional application No. 60/428,134, filed on Nov. 20, 2002.

(51) Int. Cl.
*G06F 13/00* (2006.01)

(52) U.S. Cl. ............... 709/206; 709/219; 709/225
(58) Field of Classification Search ........ 709/206, 709/219, 223, 224, 225
See application file for complete search history.

(56) References Cited

U.S. PATENT DOCUMENTS 5,999,967 A 12/1999 Sundsted
(Continued)

FOREIGN PATENT DOCUMENTS

WO WO 01/67330 A1 9/2001
(Continued)

OTHER PUBLICATIONS

Cynthia Dwork, et al., "Pricing via Processing or Combatting Junk Mail," Draft of full version, preliminary version of this paper was presented at Crypto '92, pp. 1-11, undated.
(Continued)

*Primary Examiner*—Viet D. Vu
(74) *Attorney, Agent, or Firm*—Blank Rome LLP

(57) ABSTRACT

Message delivery approaches are disclosed through which senders can guarantee that their messages are desired by intended recipients. In one embodiment, a Sender agrees with a Service Operator to pay a fine for each message that is reported as an unwanted by its Recipient. For senders that agree in advance to pay such fines, Service Operators may provide preferential message routing around "spam" filters knowing that a guarantee is in place. If the Recipient reports that the message is unwanted, the Service Operator can penalize the Sender by a fine in the agreed amount, or by modifying a bond ratio value, rating, or other experience value associated with the Sender. Estimates of the complaints expected for a Sender may be used to determine the outcomes of the tests applied by the Receiver.

58 Claims, 16 Drawing Sheets

U.S. PATENT DOCUMENTS

| | | | |
|---|---|---|---|
| 6,192,114 | B1 | 2/2001 | Council |
| 6,421,709 | B1 | 7/2002 | McCormick et al. |
| 6,460,050 | B1 | 10/2002 | Pace et al. |
| 6,697,462 | B2 * | 2/2004 | Raymond ................ 379/93.02 |
| 2002/0133469 | A1 | 9/2002 | Patton |
| 2003/0061291 | A1 * | 3/2003 | Takahashi ................... 709/206 |

FOREIGN PATENT DOCUMENTS

| | | |
|---|---|---|
| WO | WO 02/25464 A1 | 3/2002 |
| WO | WO 02/39356 A1 | 5/2002 |

OTHER PUBLICATIONS

Declude, "List of All Known DNS-based Spam Databases," Apr. 20, 2004, http://www.declude.com/Articles.asp?ID=97, data retrieved Aug. 19, 2004, pp. 1-15.

International Searching Authority, "Notification of Transmittal of the International Search Report or the Declaration," Jun. 8, 2004, 7 pages.

Current Claims in PCT patent application, International Application No. PCT/US03/37417, 16 pages, filed Nov. 20, 2003.

* cited by examiner

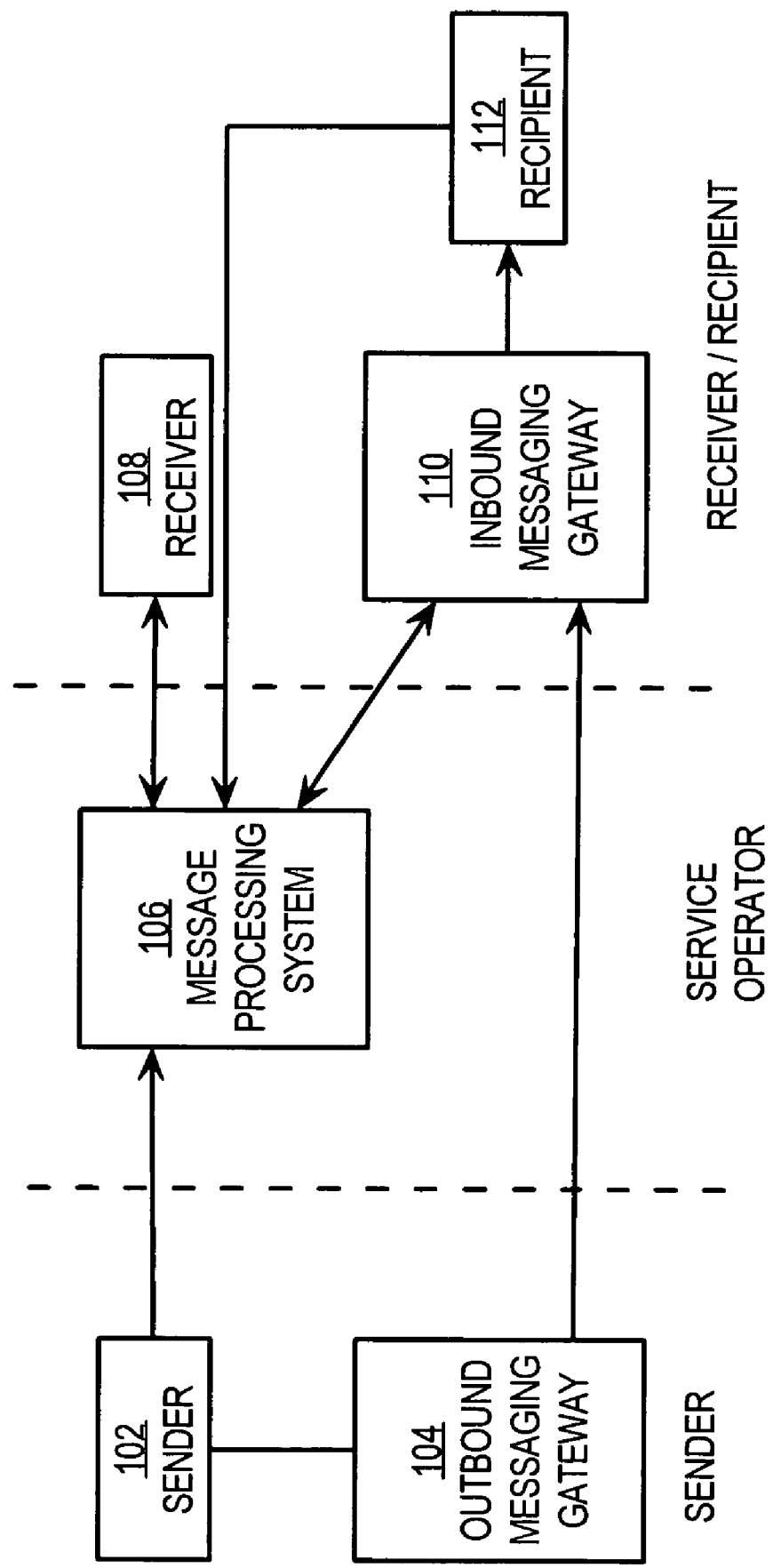

METHOD OF ELECTRONIC MESSAGE DELIVERY WITH PENALTIES FOR UNSOLICITED MESSAGES

RELATED APPLICATIONS; PRIORITY CLAIM

This application claims domestic priority under 35 U.S.C. 119 from prior Provisional application Nos. 60/428,134, filed Nov. 20, 2002, and 60/482,883, filed Jun. 25, 2003, the entire contents of which are hereby incorporated by reference as if fully set forth herein.

FIELD OF THE INVENTION

The present invention generally relates to electronic message delivery with estimation approaches. The invention relates more specifically to methods and systems for ensuring that electronic messages are delivered.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The use of electronic message communication systems has increased significantly in the recent past. However, numerous users of such systems, whether they are message senders or receivers, find such systems inconvenient and cumbersome to use. Similar problems are associated with telephone, facsimile, and e-mail communications, and others.

In the e-mail context, in one past approach, senders marketing commercial products or services would acquire or develop lists of e-mail addresses and then periodically send mass unsolicited e-mail messages ("spam") to all addresses in the lists. Using modem electronic systems, the cost of sending millions of such messages has been negligible, and a response rate of even less than one percent has been considered worthwhile. Thus, successful delivery of unsolicited messages to valid in-boxes of recipients normally translates into income for the sender.

Unfortunately, this approach causes receivers to receive unwanted messages. The perceived direct and indirect costs of receiving "spam" are high. In response, receivers have adopted a variety of approaches to prevent receipt or viewing of unwanted messages.

In one approach, receivers use filtering or blocking technologies that search for keywords in the message subject line and reject or quarantine messages that contain keywords matching a list of prohibited words. In another approach, receivers use "black lists" to identify and prohibit display of messages from suspect senders of unsolicited messages. Some receivers augment these technologies with personal "white lists" of friends or other acceptable senders; only messages from senders in the "white list" are admitted. The "white lists" and "black lists" also may come from networked sources. Techniques for performing "black list" lookups are described at the document "ip4r.htm" that is available online at the time of this writing at directory "/junkmail/support/" of the "declude.com" domain of the World Wide Web, and www.scconsult.com/bill/.

For legitimate senders, one problem is that legitimate messages do not reach intended receivers because they are blocked by such filtering or blocking technologies. Meanwhile, receivers who use filtering or blocking technologies regularly fail to receive legitimate messages because the filtering and blocking technologies cannot properly distinguish legitimate messages from unwanted messages. Certain industry-standard terms or technical abbreviations may be identical to prohibited keywords, confusing the "spam" filter.

Further, receivers continue to receive large volumes of unwanted messages that are not properly trapped by the "spam" filter. As a result, many receivers now refuse to disclose their address except under limited circumstances. In response, many legitimate senders, such as reputable commercial enterprises, have developed "opt-in" procedures in which the addresses of receivers, such as customers, are not used at all unless the receiver affirmatively agrees to receive messages. Even when this is done, the filtering or blocking technologies may delete or quarantine even those messages from legitimate senders that are directed to receivers who have "opted in."

Consequently, the value of e-mail as a legitimate marketing tool for communications directed to receivers who have "opted in" is decreasing. Many receivers remain essentially defenseless to the daily onslaught of "spam" arriving in their e-mail in-boxes. While many states have enacted legislation that imposes civil or criminal penalties for sending "spam," these remedies are time-consuming for receivers to pursue. In addition, while many Internet Service Providers ("ISPs") actively identify and refuse to communicate or do business with those who send "spam," policing such improper activity imposes a significant cost on the ISP.

ISPs also incur costs associated with processing messages directed to recipients who do not hold an account with the ISP. For these recipients, the ISPs mail system typically generates an automatic "bounce" message that states that the recipient is unknown. Indeed, a "double bounce" may occur when a message bears an invalid sender address, and is sent to an invalid recipient. Costs are associated with maintaining the equipment and software that generates the bounce messages, and for dispatching the bounce messages back into the network to the sender. Thus, there is a need for a system or method that can reduce the number of "bounce" and "double bounce" events experienced by ISPs and derived from unwanted messages.

Thus, the problem of "spam" in the Internet e-mail context is essentially a war of attrition. There are legitimate marketing organizations that send promotional messages by bulk e-mail, and other senders who send valid bulk messages. In general, however, no one benefits from the activities of "spammers," other than the "spammers" themselves. ISPs, business enterprises, and end users all suffer inconvenience, costs, and annoyances.

Further, high-value e-mail messages regularly may be blocked or placed into a "Bulk" mail folder, based on rules that appear, to the end user, as complex, random, changing and secret. This costs e-mail marketers, and causes senders to lose confidence in the benefits of e-mail marketing. Moreover, end users are required to invest time in monitoring, checking, delivering, and negotiating "white lists" and similar mechanisms. Even when ISPs and enterprises use anti-"spam" technologies, large numbers of "spam" messages still arrive in the in-boxes of end users, or erroneously are placed in bulk mail folders.

While the foregoing example problems exist in the context of e-mail, instant messaging, chat-room applications, Web message boards, telephone and facsimile communications suffer from analogous problems.

Based on the foregoing, there is a clear need for improved approaches to ensure that legitimate messages are received by appropriate receivers.

There is also a need for an approach that can penalize senders of unwanted messages.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates an overview of a system for delivering electronic messages;

DETAILED DESCRIPTION OF THE PREFERRED EMBODIMENT

Figure 1B:
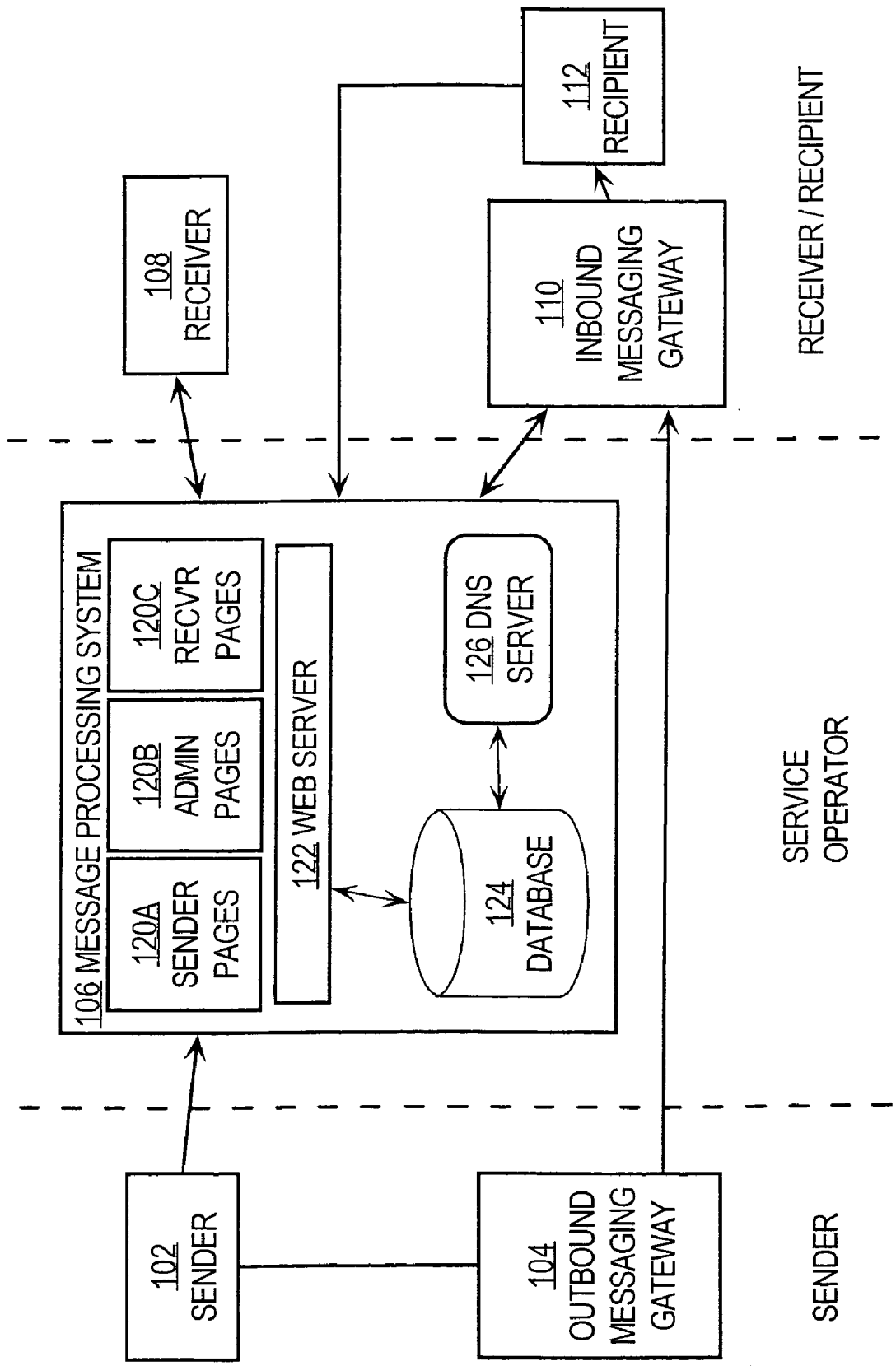
FIG. 1B is a block diagram that illustrates additional elements of the system of FIG. 1B.

Electronic message delivery approaches are described in this application. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Electronic Message Delivery Approaches
  2.1 Terminology
  2.2 System Structural and Functional Overview
  2.3 Encrypted Token Approach
  2.4 Determining Whether to Accept a Message
  2.5 Processing a Report of an Unwanted Message
  2.6 Penalizing Senders
  2.7 Estimation Approaches
3.0 Implementation Mechanisms—Hardware Overview
4.0 Extensions and Alternatives

1.0 General Overview

The needs identified in the foregoing Background, and other needs and objects that will become apparent for the following description, are achieved in the present invention, which comprises, in one aspect, a method for delivering an electronic message. In other aspects, the invention encompasses a computer apparatus and a computer readable medium configured for delivering an electronic message.

Generally, methods and systems described herein provide techniques by which message senders can guarantee that their messages are delivered to their intended Recipients, and are not blocked by the "spam" filters that are presently used by many network service providers. In one embodiment, a Sender enters into a contract with a Bonded Sender™ Service Operator, in which the Sender agrees to pay a fine for each message that is reported as an unwanted or "spam" e-mail by its intended Recipient. The Sender establishes the amount of the fine that it is willing to pay, per e-mail. The Sender may be subject to a credit check or to a requirement to place funds into escrow. Alternatively, the Sender may promise to pay a particular fine amount rather than actually providing funds in advance. (BONDED SENDER is a trademark of IronPort Systems, Inc., the assignee of this application.)

A Sender then identifies a message as "bonded" at the time the message is sent. In one embodiment, an encrypted token in a message identifies the message as bonded. Alternatively, bonded messages are sent from a specified network address that is provided to the Service Operator when the contract is negotiated. In this way, the Service Operator knows that all messages having a particular source network address in the message header are bonded.

In one embodiment, upon receiving a bonded message, a Receiver performs conventional anti-"spam" checks and filters. If the Receiver determines that the message is not "spam," the Receiver forwards the message to its intended Recipient. If the Receiver determines that the message is "spam," the Receiver checks to determine whether the sender of the message is a Bonded Sender. Such a check may be performed by issuing a query from the Receiver to the Service Operator, in which the query includes a network address of the Sender. The Service Operator determines whether the Sender is identified in a database that is maintained by the Service Operator. If so, the Service Operator sends a response to the Receiver identifying the Sender as bonded. Optionally, the response may include the amount of the fine to which the Sender agreed in the contract, or another amount.

The Receiver determines whether it will accept the message. The decision to accept can be based upon whether the fine exceeds a specified amount or threshold. The threshold value may be set as a matter of policy by the Receiver, or set in advance by or for each individual end user account-holder associated with the Receiver. For example, a user profile at the Receiver associated with User X may specify that X will not accept any potential "spam" messages from Senders that have committed to any fine less than $2.50 per message; however, a profile for User Y may specify that Y will accept messages committing any amount greater than $1 per message.

Optionally, if the Receiver determines that it will accept the message, the Receiver notifies the Service Operator. In response, the Service Operator attempts to reserve the amount of the fine or penalty. If the reservation is successful, the Service Operator sends an acknowledgment to the Receiver.

Use of reservations and tracking the aggregate number of reservations enables the Service Operator to determine whether the Sender is likely to exceed a credit limit established by the Service Operator, or whether the Sender needs to deposit additional bond funds with the Service Operator. Further, the Service Operator may refuse, as a matter of policy, to acknowledge the bonded status of any Sender that has aggregate reserved fine amounts that exceed its credit limit with the Service Operator by a specified threshold. In one embodiment, each reservation automatically expires after a specified time.

In response to receiving a reservation acknowledgment, the Receiver forwards the message to the intended Recipient. In one embodiment, the Receiver also provides, to associated Recipients, a way of signaling the Receiver that the user has identified a message as "spam." For example, a graphical user interface display may have a button designated as "Report Message As Unwanted." If the Receiver receives signals that identify messages as unwanted, the Receiver stores information about the signals and messages. Periodically, the Receiver sends reports to the Service Operator that identify which messages have been reported as "spam." In response, the Service Operator penalizes the Senders.

In certain embodiments, penalties comprise fines that variously are capped, tiered, or timed. In other embodiments, the messages variously comprise e-mail messages, instant messages, chat-room posts, Web message board posts, telephone calls, or pager messages. In still other embodiments, various revenue models are used with respect to the fines, such as sharing fines with Receivers, sharing fines with non-profit organizations, charging Receivers or Senders to participate, etc.

2.0 Electronic Message Delivery Approaches 2.1 Terminology

Throughout this document, the following terms have the following example meanings:

"Bond" means a quantity of value that is transferred by the Sender to the Service Operator before the Sender dispatches one or more bulk messages. A bond may comprise money, resources of any kind, goods, services, or promises.

"Enterprise" means a business entity that is not primarily in the business of sending bulk messages; its employees are often Recipients.

"Receiver" means a business entity, hardware device, software element, or combination of the foregoing that receives messages and distributes the messages to Recipients. Examples of Receivers include business enterprises, Internet Service Providers (ISPs), Web-based e-mail services, etc.

"Recipient" means an individual account, computer, or end user that reads, uses or otherwise consumes a message sent by a Sender. Recipients often are end users who hold accounts with Receivers.

"Sender" means an individual or business entity that regularly sends large numbers of messages to actual or prospective customers, subscribers, members, or other Recipients. Examples of Senders include retail businesses, online businesses and brick-and-mortar businesses, advertising service firms, electronic mailing list providers, etc. A Sender also comprises an individual who registers and manages Bonded Sender network addresses for a separate end user or system that sends messages or causes messages to be sent.

"Service Operator" means a trusted third party that acts as a provider of the functions and services defined herein.

"Spam" means an unwanted e-mail message, which is typically a mass unsolicited message.

"Submitter" means an individual or business entity that reports to the Service Operator that one or more received messages are or were unwanted. A Submitter may be a Receiver or a Recipient. A party that makes or sells anti-"spam" filters, software or other technology may act as a Submitter to reduce the number of "false positives" generated by its technology.

2.2 System Structural and Functional Overview

FIG. 1A is a block diagram that illustrates an overview of a system for delivering electronic messages. A Sender 102, which owns, operates or is associated with an outbound messaging gateway 104, is communicatively coupled directly or indirectly through one or more networks to a Message Processing System 106 that is owned or operated by a Service Operator. A Receiver 108 is communicatively coupled to the Message Processing System 106. The Receiver owns, operates, or is associated with an inbound messaging gateway 110. A Recipient is communicatively coupled to gateway 110.

Each Gateway 104, 110 may comprise a general-purpose messaging gateway, also known as a Message Transfer Agent (MTA), mail relay, email relay, email router, Simple Mail Transfer Protocol (SMTP) server, or email gateway, which is specially programmed to perform the functions described herein.

For purposes of illustrating a simple example, FIG. 1A shows one of each element identified above. However, in a practical embodiment, there may be any number of Senders, Receivers, gateways, and Recipients, and the use of thousands or millions of such elements is contemplated. In a high-capacity network environment, Message Processing System 106 may be replicated in one or more instances or sites for scalability or load-balancing purposes. Further, for example purposes, certain embodiments are described herein in the context of processing e-mail messages; however, in other embodiments the messages comprise telephone calls, or pager messages.

In the arrangement of FIG. 1A, in general, in one embodiment, Sender 102 registers with Message Processing System 106 and obtains an account with the Service Operator. Optionally, Receiver 108 also registers and obtains an account. The Sender 102 may select a dedicated source network address that is used for bonded messages, and provides the selected address to Message Processing System 106. At any time thereafter, Sender 102 causes its outbound messaging gateway 104 to send one or more messages, which contain information identifying an offered or promised penalty amount, and are directed to Recipient 112.

The messages are received at the inbound messaging gateway 110 of the Receiver 108. Gateway 110 determines that the messages are bonded. Gateway 110 queries Message Processing System 106 to determine whether the messages originate from a party that is registered in the Message Processing System as a Bonded Sender. Message Processing System 106 and gateway 110 apply one or more validation tests to information in the message or derived from packets that transport the message. Depending on the results of the tests and policy decisions applied by the gateway 110, the message is delivered to the Recipient 112, or a score value is provided to a filter, or the message is discarded, or the message is marked as Bulk, or other actions are taken.

The foregoing is a general statement of operation of one example embodiment that is provided for purposes of orienting the reader to FIG. 1A. However, many variations and additional example functions are described further herein.

FIG. 1B is a block diagram that illustrates additional elements of the system of FIG. 1B. Message Processing System 106 may be implemented as one or more server-class computer systems that host a Web server 122, database 124, and DNS server 126. Web server 122 may comprise a combination of an HTTP server, such as the Apache HTTP server, and an application server such as the WebLogic application server. Database 124 provides a repository for storing information about registered Senders, Receivers, Recipients, bonds, messages, and other metadata, and may comprise a relational database server such as Oracle 8i, Microsoft SQL Server, etc. Database 124 also may contain log information such as a history of network addresses that have been added or deleted by Senders.

DNS server 126 is accessible using Internet Domain Name System ("DNS") protocol requests and can perform resolution of domain names to Internet Protocol ("IP") addresses, provide information about specified IP addresses, etc. For purposes of illustrating a clear example, DNS and IP are described herein for certain embodiments; however, embodiments are not limited to the use of DNS and IP for address processing, and the invention is applicable to any network addressing mechanisms or protocols that may be developed in the future.

For a practical embodiment, DNS server 126 has high capacity. For example, an appropriate DNS server 126 can process on the order of fifty million queries per day. Further, a DNS server that has nearly 100% availability and does not impose unreasonable message latency should be provided.

Functions described herein may be implemented in one or more Java Server Pages (JSPs), Active Server Pages (ASP's), or other software elements. For purposes of illustrating an example, FIG. 11B shows a JSP implementation in which functions are organized as Sender Pages 120A and Administrative ("Admin") Pages 120B. Optionally, Receiver ("Recv'r") Pages 120C provider receiver functions. In this implementation, Sender 102 and Receiver 108 may access functions of system 106 using a conventional Web browser application, such as Microsoft Internet Explorer, Netscape Communicator, etc. Similarly, gateway 110 may access functions of system 106 by directing HTTP requests to system 106.

In particular, Sender 102 interacts with Sender Pages 120A to register with the system and obtain information about bond amounts offered or promised, credit exposure, complaints received, message volume sent and fines incurred. An administrator associated with the Service Operator interacts with Admin Pages 120B to perform administrative functions such as user registration and validation, providing registered Sender information to representatives of Senders, user maintenance, address maintenance, system maintenance, bond forfeiture, invoicing, account reviews, dispute resolution, report generation, etc. A Receiver or Recipient interacts with Receiver Pages 120C to register with the system, report unwanted messages, investigate credit and bond status, etc.

Message Processing System 106 also may comprise one or more other software elements, hardware elements, or manual operations that perform the functions described herein.

Figure 2A:
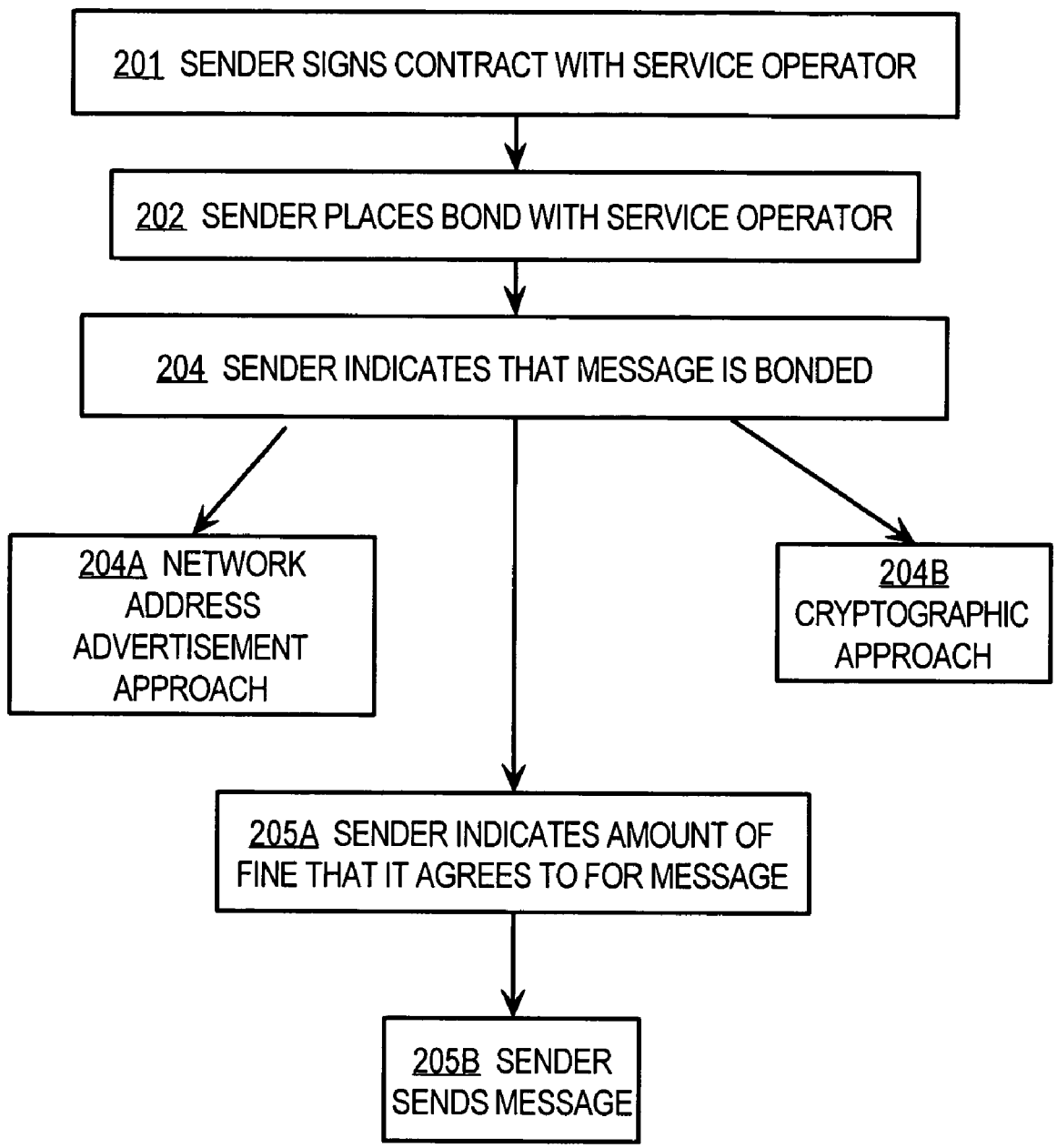
FIG. 2A is a flow diagram of a process of electronic message delivery, according to one embodiment.

FIG. 2A is a flow diagram of a process of electronic message delivery, according to one embodiment. In block 201, one or more Senders enter into contracts with the Service Operator. In one embodiment, the Senders agree to pay fines for sending unwanted messages, subject to a dispute resolution process that addresses fraudulent reports of unwanted messages, and false reports from Recipients who did not actually receive the messages.

Block 201 may include engaging in a registration process in which the Senders provide contact information and credit information to the Service Operator. In the registration process, an administrator or other authorized representative of a Sender or Receiver may establish a password-protected account at the Service Operator for the purpose of entering, updating, and viewing information relating to their interaction with the Service Operator.

In one embodiment, as part of block 201, a Sender provides, to the Service Operator, one or more IP addresses that it wishes to bond, and specifies whether DNS "A" and "PTR" records exist in the DNS system for the addresses.

In another embodiment, the terms and conditions of the contract specify that: the Service Operator will review the address information that is provided, to verify ownership of the IP addresses and proper configuration of the DNS records; the Sender may use the system to send only messages that conform to a set of standards; and other terms and conditions relating to legal liability, confirmation of registration, fees, etc. The contract may be implemented as a "click-to-accept" online form.

In yet another embodiment, any or all of the steps in the registration process described above are performed using non-online communication methods, such as by telephone, fax, etc. In this embodiment, a representative of the Sender contacts an administrator associated with the Service Operator, who creates records in the system that capture the above-described information. For example, the contract terms outlined above may be negotiated and agreed to using fax communications.

Block 201 also may involve the Service Operator performing a validation of the network addresses and other information provided by a Sender. For example, an administrator of the Service Operator performs a reverse (PTR) DNS lookup for each IP address provided by the Sender, and records information about each domain that is returned by the DNS system. The Service Operator performs a "whois" lookup to verify that the domain name ownership of record matches the Sender. Other tests may be performed to verify that the Sender is not a "spammer" or to verify that the Sender segregates its bulk mailing lists to ensure that only non-"spam" messages are directed to bonded addresses.

In block 202, in one embodiment, a Sender places a bond with the Service Operator. Placing the bond may form part of entering a contract in block 201. In some embodiments, the Service Operator performs a credit check on the Sender and does not require a bond. Alternatively, a Sender lacking adequate credit or payment history is required to deposit funds with the Service Operator. The deposited funds may be placed in an escrow account, trust account, or similar account from which the Service Operator may withdraw funds only upon determining that an unwanted message has been sent.

In block 204, the Sender indicates that a particular communication is bonded and subject to fines. Such an indication may be provided in several ways. In a first approach, indicated by block 204A, the Sender advertises a particular network address, selected by the Sender as its "Bonded Sender" address. In one embodiment, which is used in networks that use Internet Protocol ("IP") addresses to identify the source of a message, the Sender registers a specified Bonded Sender source IP address with the Service Operator, and then sends bonded messages only from that address. Alternatively, as in block 204B, a cryptographic approach is used. Methods of advertising a message source are described further in other sections hereof.

In block 205A, the Sender indicates what amount of fine it agrees to pay if a particular message or communication is unwanted. In one approach, the Sender registers a proposed fine amount with the Service Operator before sending messages. Alternatively, a cryptographic approach of specifying the fine may be used. In yet another alternative, the Sender issues a promise to the Service Operator that the Sender will pay a particular fine amount for unsolicited messages; an actual transfer of funds in advance of sending messages is not required. In one embodiment, fixed or variable penalty values are imposed, based on a complaint rate or other metric. For example, a Sender may be debited $20 for every complaint in excess of one per million. Any other suitable complaint rate or penalty value may be used. In one embodiment, all fines may be a single specified amount that does not vary, such as $1 per unwanted message. Minimum fines, maximum fines, or fines that vary for particular messages or Recipients also may be used. In block 205B, the Sender sends the message. Block 205B may involve causing a messaging gateway to dispatch one or more messages into a network.

Figure 2B:
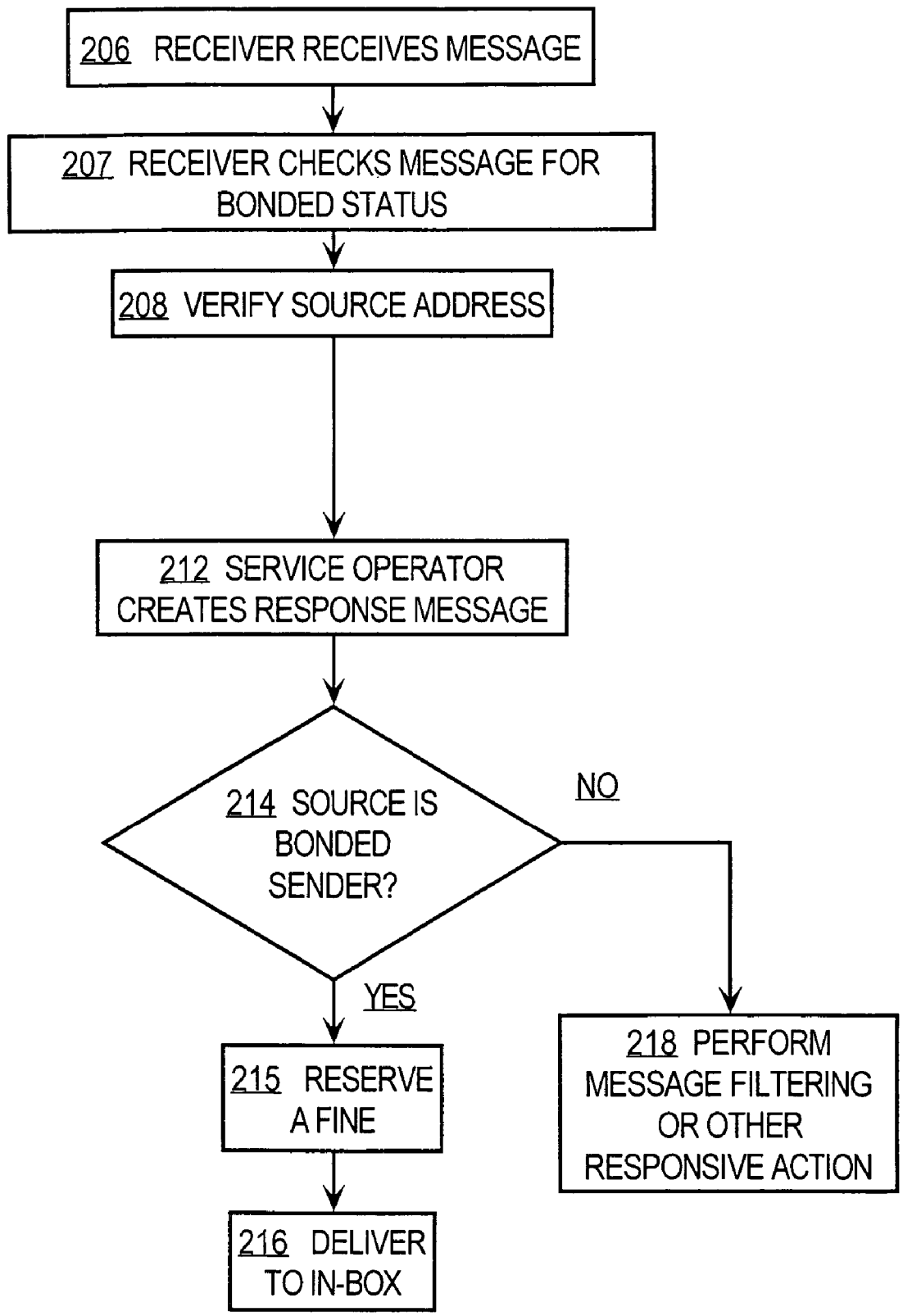
FIG. 2B is a flow diagram of a method of processing received electronic messages.

FIG. 2B is a flow diagram of a method of processing received electronic messages. Referring first to block 206, a Receiver, who may be an individual end user, an ISP, a business enterprise, or any other person or institution, receives a message from the Sender.

In certain embodiments, Receivers and Recipients register with the Service Operator before receiving messages in order to obtain a right to use the services of the Service Operator. For example, Receivers and Recipients register as part of block 201 of FIG. 2A. Registration of a Receiver or Recipient may involve providing contact information, domain name and e-mail address information, gateway information, information about anti-"spam" technologies then in use by the Receiver, etc. In response to successful registration of a Receiver, the Service Operator may provide Bonded Sender DNS information to the Receiver or Recipient to enable them to configure their gateways to interoperate with the system.

Block 206 may involve performing conventional anti-"spam" checks using commercial anti-"spam" filtering or blocking technology. In such an embodiment, the Receiver proceeds with the remaining steps of FIG. 2B only if a message is identified as "spam." If the message passes the "spam" checks, then it is forwarded to the Recipient. In an alternate embodiment, the remaining steps of FIG. 2B are performed regardless of the results of the anti-"spam" filtering technology.

In block 207, the Receiver checks the communication for bonded status. This may involve several tests.

For example, in block 208, the Receiver verifies the source address of the received message against the database of advertised Bonded Sender addresses. For example, the Receiver issues a query in an agreed-upon protocol to the Service Operator, and provides the source address of a message that the Receiver has received. In one specific embodiment, as in the example of FIG. 1A and FIG. 1B, block 208 involves gateway 110 issuing a DNS lookup request to DNS server 126 that includes the source address of the received message. If DNS server 126 locates the source address in its database, then a first specified response value is returned. If the source address is not in the DNS database, then a second specified response value is returned. In one embodiment, the first response value is "127.0.0.2" and the second response value is "127.0.0.3."

The Service Operator creates a response message that identifies whether the source address is a registered Bonded Sender address, and sends the response message to the Receiver, as shown by block 212.

The foregoing tests also may involve determining the fine amount proposed by the Sender for the message. Further, the Receiver may undertake more or fewer tests, or different tests, depending on the amount of bond or penalty that has been offered or promised by a Sender for a particular message.

Depending on whether the source address identifies a registered Bonded Sender, the Receiver can take responsive action. For example, in block 218, if the source address is not a registered Bonded Sender address, as tested in block 214, the Receiver may elect to block the message, or deliver it to a bulk e-mail folder, or perform any other message filtering step.

If the source address is verified as a registered Bonded Sender address, then the Receiver may reserve a fine amount by sending a message to the Service Operator in an agreed-upon protocol, as shown by block 215. In response, the Service Operator creates a record of a fee reservation in its database, determines an expiration date for the reservation, and issues a response message to the Receiver.

In one embodiment, reserving a fine may constitute an agreement by the Receiver to deliver the message to the Recipient's In-box without any special marking or processing, that is, without labeling the message as Bulk, storing the message in a Bulk folder, etc. In this embodiment, the Service Operator and Receivers enter into a contract providing and enforcing such terms. Alternatively, such a rule may be enforced in the absence of a contract based good faith relationships of the parties.

Further, in still another alternative, a fee reservation may comprise agreements by the Service Operator to pay a portion of any fine to the Receiver in the event that a Recipient reports the message as unwanted before the reservation expires. Each reservation is associated with an expiration date, after which the reservation expires. The expiration date may occur at any time after the issuance of a reservation. In one embodiment, the reservation is typically one to four days after issuance of the reservation.

Use of reservations enables the Service Operator to evaluate and measure the scope of its current credit risk with respect to each Sender. For example, issuing more reservations means that more opportunities for junk reports are created. Further, based on reservation volume, the Service Operator may demand a deposit of additional funds by the Sender, or may perform additional credit checks to verify that its exposure to Recipients is acceptable.

Thereafter, the Receiver could elect to deliver the message to the in-box of the Recipient, as shown by block 216.

In an alternative embodiment, a gateway associated with the Receiver may deliver the message to an outbound address that is selected from among a plurality of outbound addresses. In this embodiment, as part of block 201, a particular Sender may register a plurality of authorized outbound Bonded Sender addresses. Each such address may have a unique name. One or more routing rules determine how to select an outbound message address based on a Sender address. When the Service Operator determines that a Bonded Sender has sent a particular message, the service provider applies the rules, or an injection filter mechanism, to map the source address specified in the message to one of the multiple registered addresses. The Service Operator provides the mapped outbound address to the gateway, which delivers the message to that address.

In an alternative embodiment, by advance agreement between the Receiver and the Service Operator, the Receiver is required to deliver all messages having registered Bonded Sender addresses to the in-boxes of the Recipients of the messages.

In another alternative embodiment, when a Receiver delivers a message having a registered Bonded Sender address to the in-box of the Recipient of the message, the Receiver marks the message as originating from a registered Bonded Sender. For example, a graphical user interface that displays a message in-box of an account-holder could display a distinctive icon that identifies messages originating from a registered Bonded Sender. Alternatively, the Receiver may modify the subject line of the message to indicate that it originates from a registered Bonded Sender.

In still another alternative embodiment, the specific action taken by the Receiver may vary depending upon the amount of bond that is offered or promised by the Sender.

According to one embodiment, the mail delivery approaches herein provide a system and process with which a Receiver of unwanted e-mail can indicate, to the Service Operator, that a message is unwanted, implicitly requesting enforcement of the bond or issuance of a penalty. In another embodiment, a third party server or system may collect such complaints from Receivers. The complaint collector can forward complaints to the Service Operator or perform any responsive action described herein that the Service Provider could perform, as proxy for the Service Operator. An example of a third party that could be used as a complaint collector is the SPAMCOP™ service available from Spam-Cop.net, Inc. at the domain spamcop.net.

In one alternative embodiment, a zone transfer function is provided. Using the zone transfer function, an authorized individual associated with a Receiver can inform the Service Operator, in a single operation, that a plurality of servers or other facilities associated with the Receiver have moved to a different range of addresses.

An administrator of the Service Operator also may generate reports for Senders and Receivers. For example, reports may specify the number of queries issued by a Receiver, number of entities performing queries, which IP addresses were queried, etc.

Figure 3:
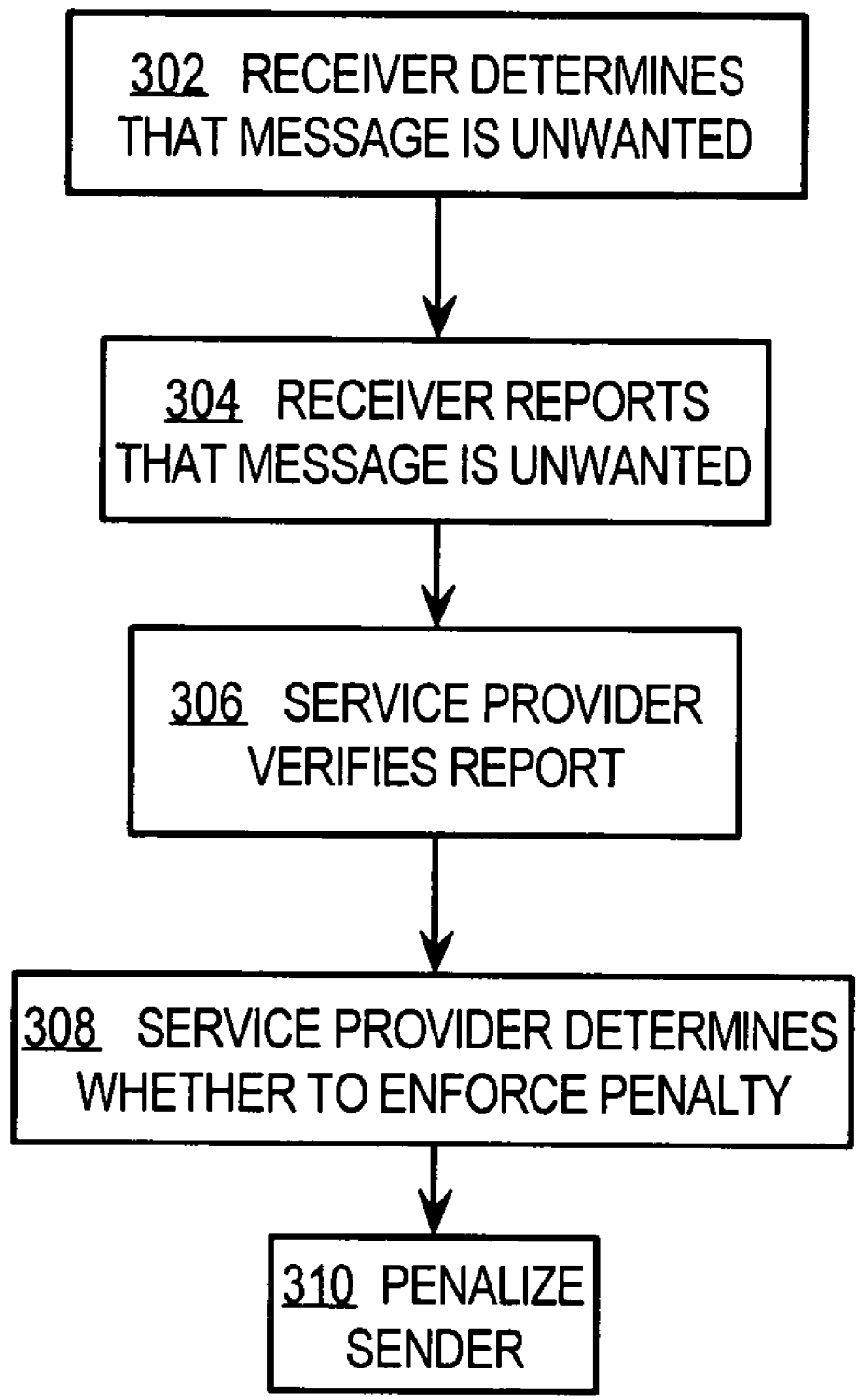
FIG. 3 is a flow diagram of a method of reporting an unwanted message.

FIG. 3 is a flow diagram of a process of reporting an unwanted message. In block 302, a Receiver determines that a received message is unwanted. A Receiver may not want a received message for several reasons. For example, the unwanted message may be a "spam" message, or the message may have resulted from failure of the Sender to honor a request to "unsubscribe" from a mailing list, failure of the Sender to comply with principles of the Direct Marketing Association, failure of the Sender to provide an "unsubscribe" link in a Web site, etc. Determining that a message is unwanted also may involve generating reports of messages that bounced or double-bounced.

In block 304, the Receiver reports, to the Service Operator, that the message is unwanted. Block 304 may involve use of any of several reporting mechanisms. For example, an enterprise Recipient or ISP may provide, in a graphical user interface that is used to view an e-mail in-box, a graphical button, clickable logo, clickable hyperlink, another selectable user interface widget for reporting unwanted messages. The widget may be labeled, e.g., "Report As 'Spam' To Bonding Organization." Alternatively, the Receiver may provide a specified address for a Recipient to forward unwanted messages, reports of bounced or double-bounced messages, messages sent to accounts that have not opted-in to receive commercial e-mail, etc. A Receiver may accumulate or collect such reports and submit the reports in a batch to the Service Operator.

In one embodiment, a report that a message is unwanted comprises a source address value, sender identification, Recipient identification, and information identifying the claimant of a fine, or the reporting party. The source address value, sender identification, and Recipient identification may be obtained by the reporting party from the message. The information that identifies the claimant of a fine may comprise a Receiver identifier that the Receiver obtained from the Service Operator as part of registering with the Service Operator.

Use of the system does create a risk that end users will falsely report that messages are unwanted, in order to maliciously generate a financial claim against the sender. To detect or deter such false reports, in one embodiment, a verification step is provided, as indicated by block 306. For example, block 306 may involve displaying a dialog box to the user that states, "You indicated that a message is unwanted. Please click below to verify." Alternatively, such a message may be provided in an e-mail message that is directed to the Receiver and that is automatically generated in response to receiving a report of an unwanted message.

In one embodiment, block 306 involves message gateway 102 performing one or more statistical tests on each message that is reported to be unwanted. The statistical tests seek to identify signature text in the messages that indicate that the messages are unwanted. Alternatively, users may be classified in one of a plurality of trust levels. The trust level associated with a user may determine what tests are applied to determine if a message is actually unwanted. In the encryption approach described further herein, use of an encrypted token provides non-repudiation of a message, and prevents a malicious party from falsely contending that it is entitled to a fine for a message that was never sent.

Alternatively, other security approaches may be used to promote non-repudiation. For example, SMTP authentication messages may be used to verify the sender of a message, headers with TXT white list record data included, etc.

In block 308, the Service Operator determines whether to impose a penalty. In one embodiment, determining whether to impose a penalty involves determining that a report of an unwanted message has been received, and that the sender of the unwanted message is associated with one or more instances of failure to conform to Bonded Sender principles. For example, the sender may have previously sent undeliverable mail, undeliverable mail that generated a bounce message, or may fail to provide an unsubscribe mechanism for its users. In another embodiment, determining whether to impose a penalty involves determining whether the Sender has exceeded an allowable complaint rate from all receivers or a particular Receiver. For example, an allowable complaint rate may be one complaint per million messages sent by a Sender, but two or more complaints would exceed the allowed rate.

If the test of block 308 is affirmative, then in block 310 the Service Operator penalizes the Sender. Block 308 may involve penalizing the Sender using any of the approaches described in Section 2.6 hereof, including debiting the Sender by a fixed amount for every complaint in excess of the complaint rate, debiting a variable amount according to message volume, etc.

Senders may elect to use bonded message sending for all messages, or for selected messages based upon internal criteria, economies of scale, etc. If a Sender elects not to send a bonded message, then such messages are subject to the problems outlined in the Background section hereof. Enterprises can bond outbound enterprise messages to reduce the likelihood that legitimate messages are inadvertently blocked.

Thus, embodiments herein provide a means for Senders to financially bond selected e-mail to ensure that it is delivered to the Recipient's In-box, and not blocked or stored in a Bulk folder by an anti-"spam" filter or similar technology. Embodiments also enable e-mail Receivers to ensure that messages desired by Recipients are not blocked or stored in Bulk folders as a result of a "false positive" determination by an anti-"spam" filter or similar technology. Embodiments also provide a mechanism for Receivers to ensure that financial penalties are enforced against Senders who post a bond and then send unwanted messages.

2.3 Encrypted Token Approach for Advertising Message Source

In one approach, represented by block 204A of FIG. 2A, a Sender advertises one or more network addresses from which it sends bonded messages. In this context, "advertisement" may consist of registering the Bonded Sender source address in a database that is maintained by the Service Operator. Alternatively, as in block 204B, each Sender includes, in each bonded message, a specified message header that identifies the message as a bonded message.

Figure 4:
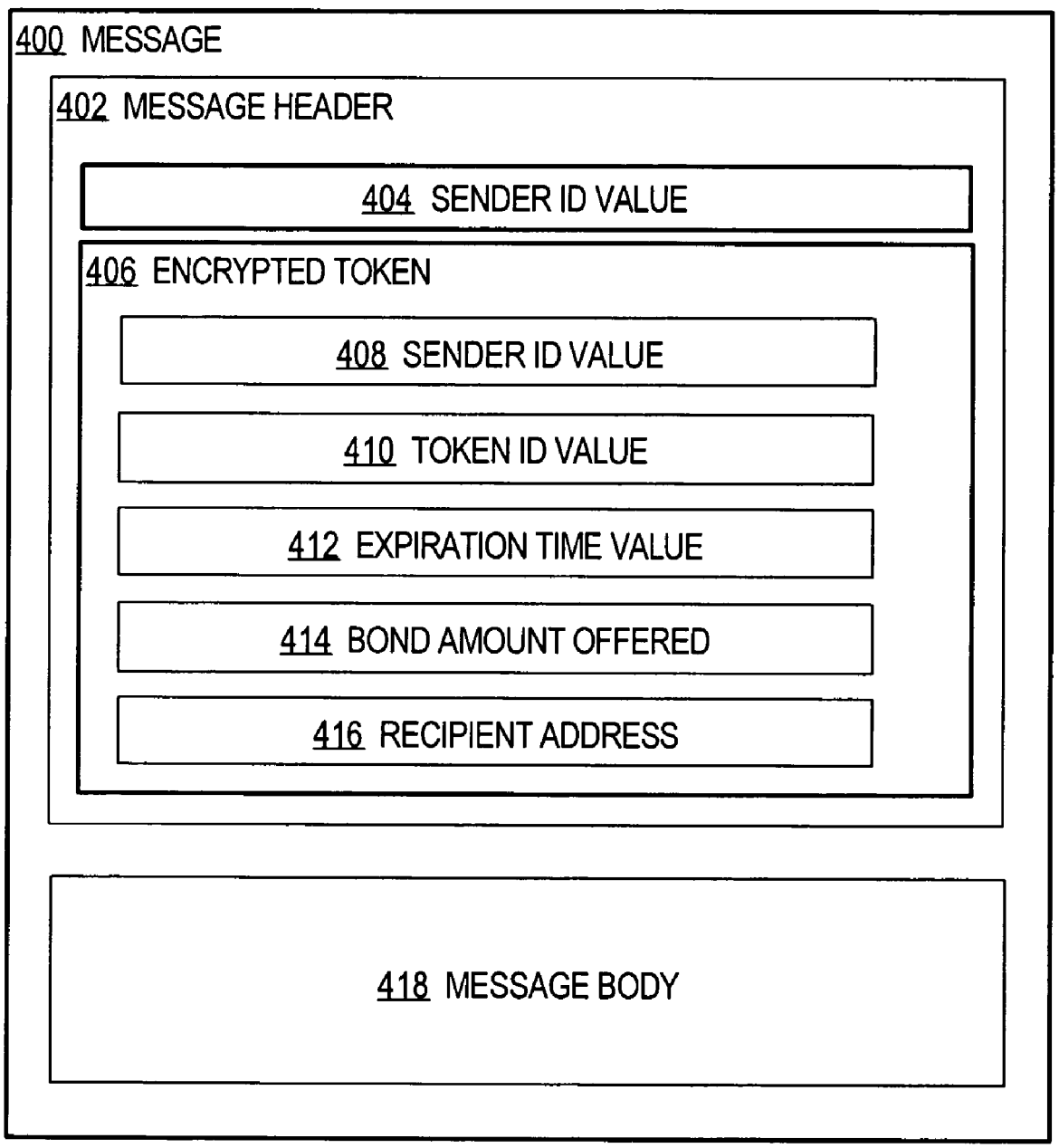
FIG. 4 is a block diagram of a message.

FIG. 4 is a block diagram of an electronic message that uses an encrypted message header approach. Message 400 generally comprises a message header 402 and a message body 418. The message header 402 may be specially designated. For example, a Sender may include a header designated as an "X-BSP" header in the message. For purposes of illustrating a simple example, message 400 is illustrated as having only the message header 402 and message body 418. However, in a practical embodiment, the message may include any number of other headers for appropriate purposes, such as SMTP headers, MIME headers, etc.

In the embodiment of FIG. 4, message header 402 comprises a sender identifier ("ID") value 404 and an encrypted token 406. The sender ID value uniquely identifies the Sender of the message 400 from among all Senders. A plaintext version of encrypted token 406 comprises a sender ID field 408, token ID 410, expiration time value 412, and bond amount offered 414.

Token 406 also includes a Recipient address value 416.

Sender ID field 408 is the same value as sender ID value 404, and is provided for non-repudiation purposes. Token ID value 410 uniquely identifies the current token from among all tokens that have been issued with the same sender ID value and the same expiration time value. Expiration time value 412 specifies a maximum time during which a Receiver may report the associated message as unwanted and thereby attempt to penalize the Sender for sending an unwanted message.

The bond amount offered 414 is an amount of value that is offered or promised by the Sender as a penalty against the Sender if the message is identified as unwanted by a Recipient.

In one embodiment, token 406 is encrypted using public key cryptography principles. For example, token 406 is encrypted with a private key that is associated with a corresponding public key that is registered with the Service Operator.

A Receiver of an e-mail message in the format of FIG. 4 obtains the sender ID and token from the message header. The Receiver then verifies the message according to one of several approaches.

Figure 5A:
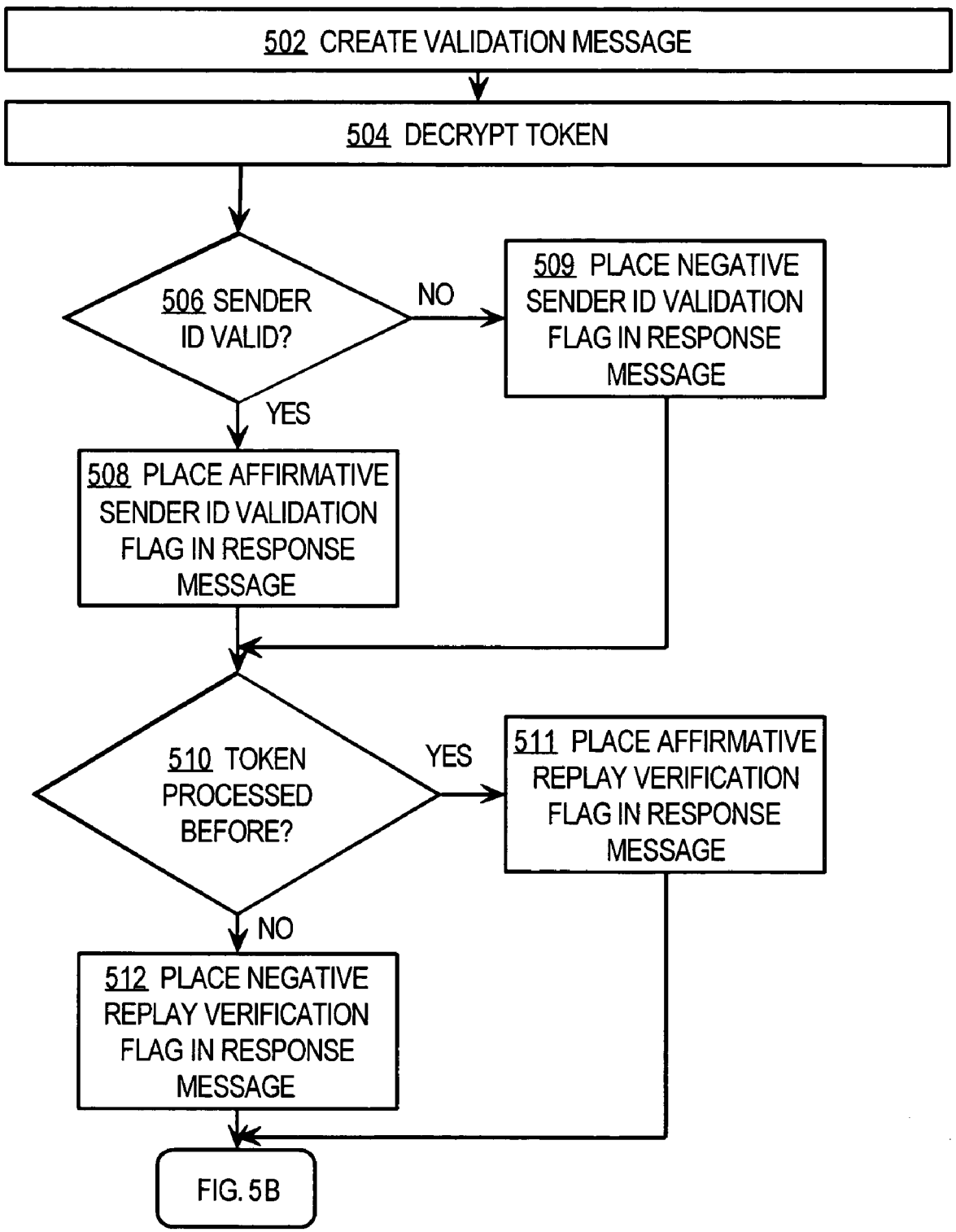
FIG. 5A is a flow diagram of a message verification approach.
Figure 5B:
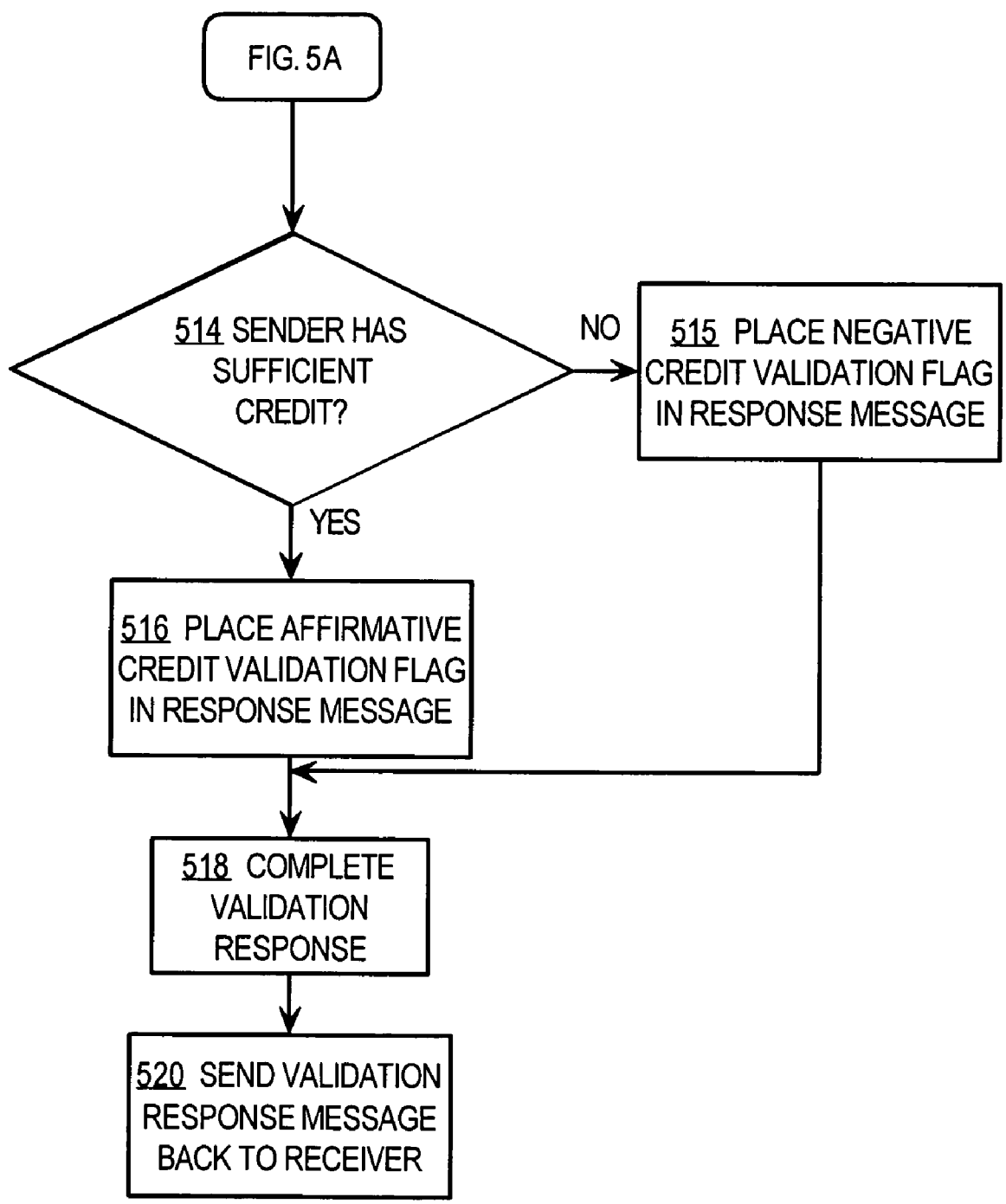
FIG. 5B is a flow diagram showing additional steps in the method of FIG. 5A.

FIG. 5A is a flow diagram of a message verification approach, and FIG. 5B is a flow diagram showing additional steps in the method of FIG. 5A. In block 502, the Receiver creates a validation message comprising the sender ID and token and submits the message to the Service Operator for validation. In block 504, the token is decrypted. In blocks 506-516, described further below, the Service Operator performs a series of tests on values obtained from the decrypted token, and places result indicators in a validation response message that is ultimately sent back to the Sender.

Referring now to block 506, the Service Operator tests whether the sender ID is valid. For example, block 506 involves testing whether sender ID value 408, obtained from the decrypted token, matches the sender ID that the Receiver provided in its validation message. If so, then in block 508 the Service Operator places an affirmative sender ID validation flag, or similar value, in the response message. If there is no match, then in block 509 a negative sender ID validation flag is placed in the response message. Alternatively, different flagging or signaling operations may be performed such that the Service Operator provides verification that the token was indeed created by the Sender.

In block 510, the Service Operator determines whether it has previously processed the same token. For example, block 510 may involve looking up token ID value 410 in a table or mapping that is maintained by the Service Operator. The table or mapping stores previously processed token identifiers, in association with corresponding sender ID values and expiration time value. If no matching token ID value is found, then the test of block 510 has a negative result. If a matching token ID value is found, then the test of block 510 has a positive result.

If a negative result occurs, then in block 512, a negative replay verification flag is placed in the validation response message. If a positive result occurs, then in block 511 an affirmative replay verification flag is placed in the validation response message. Alternatively, other methods of signaling the result of block 510 may be used. Thus, the validation message provides a verification that the Service Operator has not seen the then-current token ID from the then-current Sender in any prior token having the same expiration time value.

Referring now to FIG. 5B, in block 514, a test is performed to determine whether the Sender of the message has sufficient credit, or funds on deposit, with the Service Operator to satisfy or cover all its outstanding obligations. For example, the Sender is required to have sufficient credit or funds on deposit to cover the full value of all bond amounts offered 414 associated with all messages 400 sent by that Sender for which the expiration time value 412 is unexpired, including the then-current message. The test of block 514 may be facilitated by querying a data table, maintained by the Service Operator, which tracks the total then-current potential penalty liability for each Sender.

If the Sender has sufficient credit or funds on deposit, then in block 516, an affirmative credit verification flag is placed in the response message. If the Sender has insufficient credit, then in block 515, a negative credit verification flag is placed in the response message.

In block 518, the validation response message is completed by the Service Operator. Block 518 may involve, for example, placing the expiration time value 412, the bond amount offered 414, and the Recipient address 416, all obtained from the decrypted token 406, in the validation response message.

In block 520, the validation response message is sent back to the original message Receiver. Subsequent processing by the Receiver is described further below.

FIG. 5B is a flow diagram of an alternative approach for validating a message. FIG. 5B represents process steps that are performed by a Receiver of a message in the format of FIG. 4. Such a Receiver may be an ISP, an enterprise, an individual end user, etc.

Figure 5C:
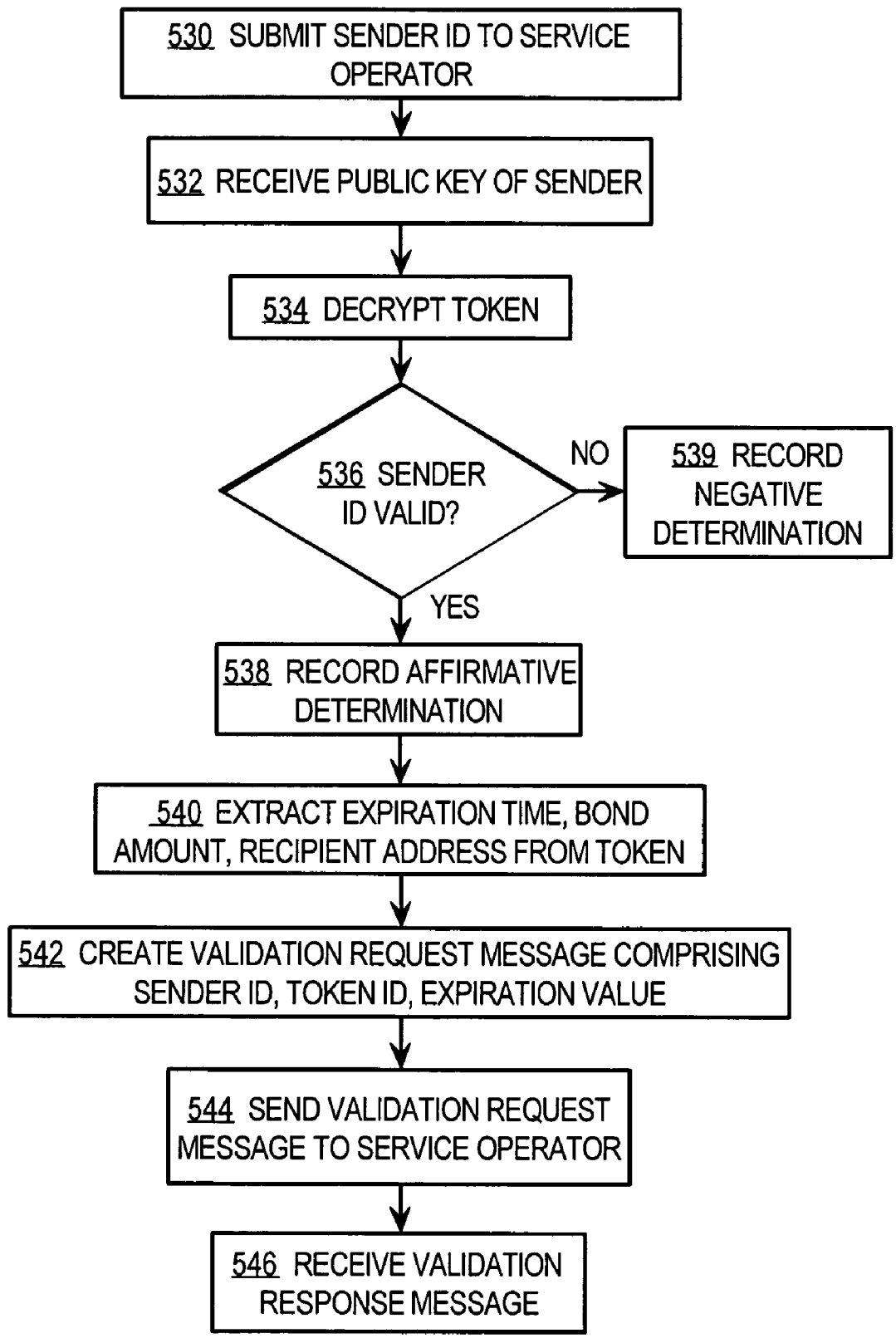
FIG. 5C is a flow diagram of a generating a validation message.

FIG. 5C is a flow diagram of a generating a validation message. In block 530, the Receiver extracts the sender ID value 404 from the message header 402 of a message 400. The Receiver submits the sender ID value 404 to the Service Operator in a request to provide the public key of the Sender. In response, the Service Operator looks up the public key of the Sender in a table, mapping or database maintained by the Service Operator, for example, using the sender ID value 404 as a lookup key or index.

In block 532, the Receiver receives the public key of the Sender, in a response message from the Service Operator. Using the public key, the Receiver can decrypt the token 406 in the message header 402, as shown by block 534.

In block 536, the Receiver tests whether the sender ID is valid. For example, block 536 involves testing whether sender ID value 408, obtained from the decrypted token, matches the Sender ID that the Receiver provided in its validation message. If so, then in block 538 the Receiver records data representing an affirmative determination. If there is no match, then in block 539 a negative determination is recorded by the Receiver. No specific data or recordation mechanism is required if the Receiver has a way to remember that it verified whether the token was indeed created by the Sender.

In block 540, the Receiver extracts the expiration time value, bond amount offered, and Recipient address from the decrypted token. In block 542, the Receiver creates a validation request message that includes the sender ID value, token ID value, and expiration time value from the decrypted token. In block 544, the Receiver sends the validation request message to the Service Operator.

In response, the Service Operator determines whether it has processed the same token before and whether the Sender has sufficient credit or funds on deposit to cover its then-current potential penalty liability, including any liability under the then-current message. Such responsive processing may involve the Service Operator performing the steps of blocks 510-520 of FIG. 5A.

In block 546, the message Receiver receives a validation response message from the Service Operator. The validation response message contains data indicating whether the Service Operator has seen the then-current token ID from the then-current Sender in any prior token having the same expiration time value, and whether the Sender of the message has sufficient credit, or funds on deposit, with the Service Operator to satisfy or cover all its outstanding obligations.

After carrying out either the approach of FIG. 5A or the approach of FIG. 5B, the Receiver may parse the validation response message, and based on the values contained in it, the Receiver may determine whether to forward the message to its named Recipient, to store the message in a bulk mail folder, to discard the message, etc. Different Receivers may establish, by policy, different responses for various values in the validation response message.

2.4 Determining Whether to Accept a Message

Figure 6:
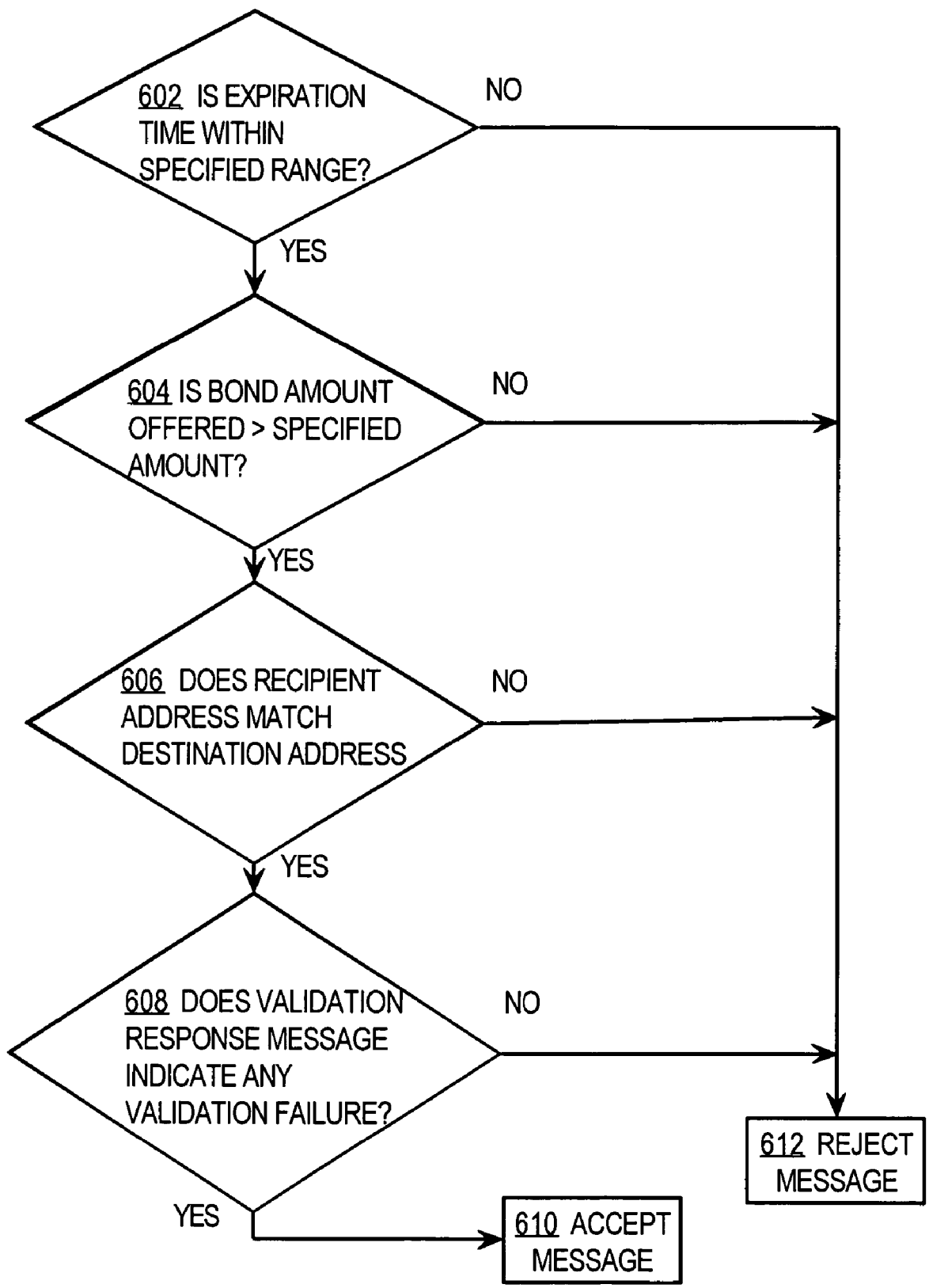
FIG. 6 is a flow diagram of validating a message.

FIG. 6 is a flow diagram of an example process for determining whether a received message is acceptable. FIG. 6 represents example process steps that are performed by a Receiver of a message after performing one of the approaches of FIG. 5A or FIG. 5B. Different Receivers may elect to perform fewer than all the steps shown in FIG. 6, or may elect to perform an entirely different process. In addition, the steps of FIG. 6 may be performed in any order.

In block 602, a Receiver determines whether the expiration time of a received message is with a specified range. For example, a Receiver may require that the expiration time value 412 of the then-current message is at least N days in the future, so that sufficient time is available to permit evaluation of the message, and possibly reporting of the message as unwanted, by the end-user or Recipient of the message. The value of N may vary widely depending on whether the Receiver is an individual end user, ISP, enterprise mail server, or other device or individual. For example, N could range from 1 to 120.

If the expiration time value is not within the specified range, then control transfers to block 612 in which the message is rejected. In this context, "rejecting" a message in block 612 may involve storing the message in a bulk mail folder, blocking the message, deleting the message, sending an automatic response to the Sender, etc. No specific rejection mechanism is required and each Receiver may elect, as a matter of policy, different processing mechanisms for different Senders, Recipients, or other circumstances.

In block 604, the Receiver determines whether the bond amount offered or promised by the Sender is greater than a specified amount. For example, the Receiver may require that bond amount offered 414 is at least D, where D is a specified value. The value of D may vary widely depending on whether the Receiver is an individual end user, ISP, enterprise mail server, or other device or individual. For example, D could range from $1 to $100, or equivalent amounts in other currencies. If the bond amount offered or promised is not within the specified range, then control transfers to block 612 in which the message is rejected.

In block 606, the Receiver determines whether the Recipient address matches the destination address of the message. For example, the Receiver compares the Recipient address value 416 to a destination network address found elsewhere in message header 402 or in another header, such as an IP packet header. If no match exists, then control transfers to block 612 in which the message is rejected.

In block 608, the Receiver determines whether the validation response message it received, as part of participating in either the approach of FIG. 5A or FIG. 5B, contains any indication of a validation failure. For example, the Receiver examines various flag values in the validation response message and determines whether a particular test of FIG. 5A, FIG. 5B failed validation. If so, then control transfers to block 612 in which the message is rejected.

If all the tests of block 602, 604, 606, 608 are successful, then control passes to block 610 in which the Receiver treats the message as "acceptably bonded." As part of such treatment, the Receiver may accept the message, place the message in an in-box associated with the Recipient, or perform other action.

2.5 Processing a Report of an Unwanted Message

Figure 7A:
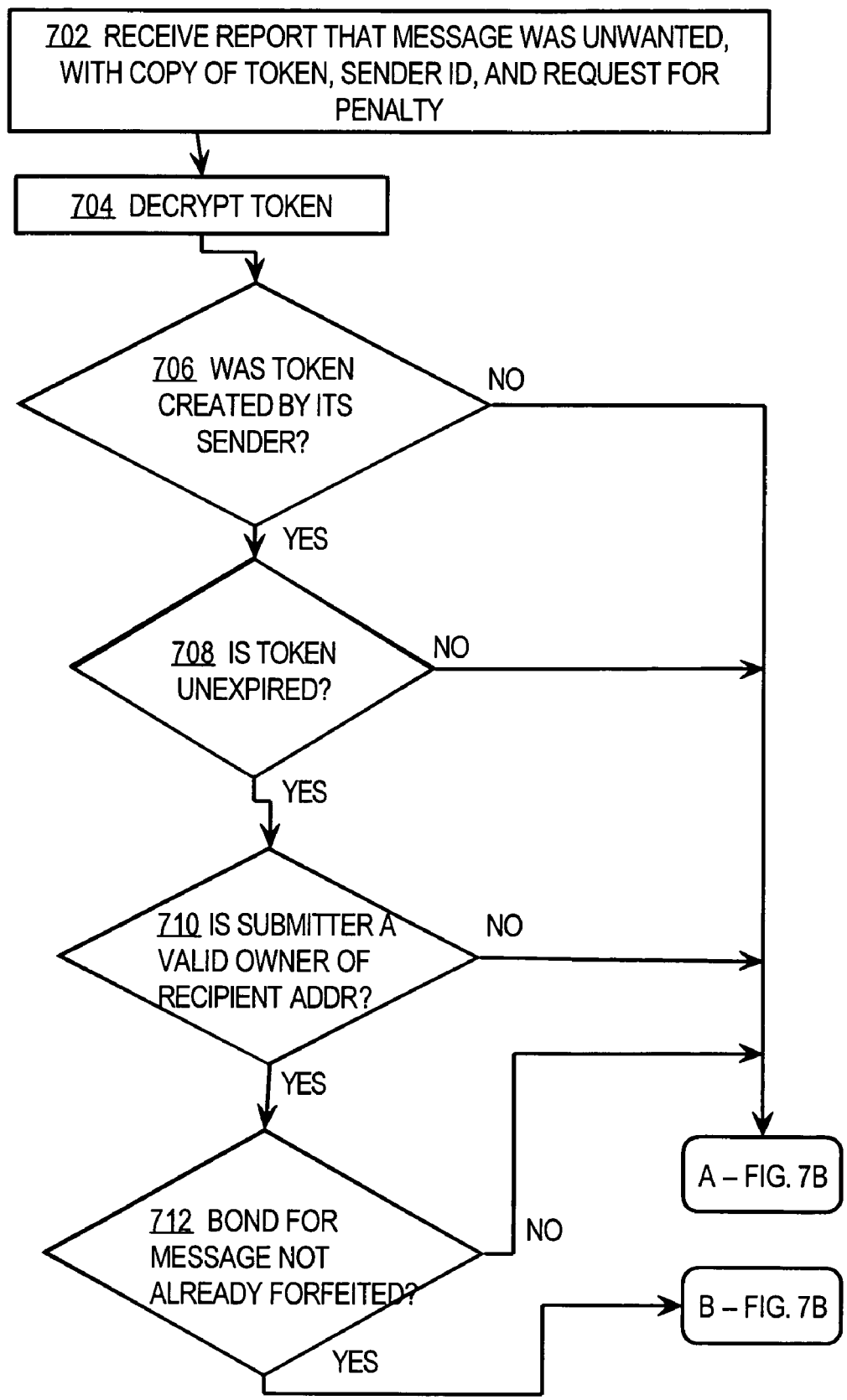
FIG. 7A is a flow diagram of verifying a report of an unwanted message.
Figure 7B:
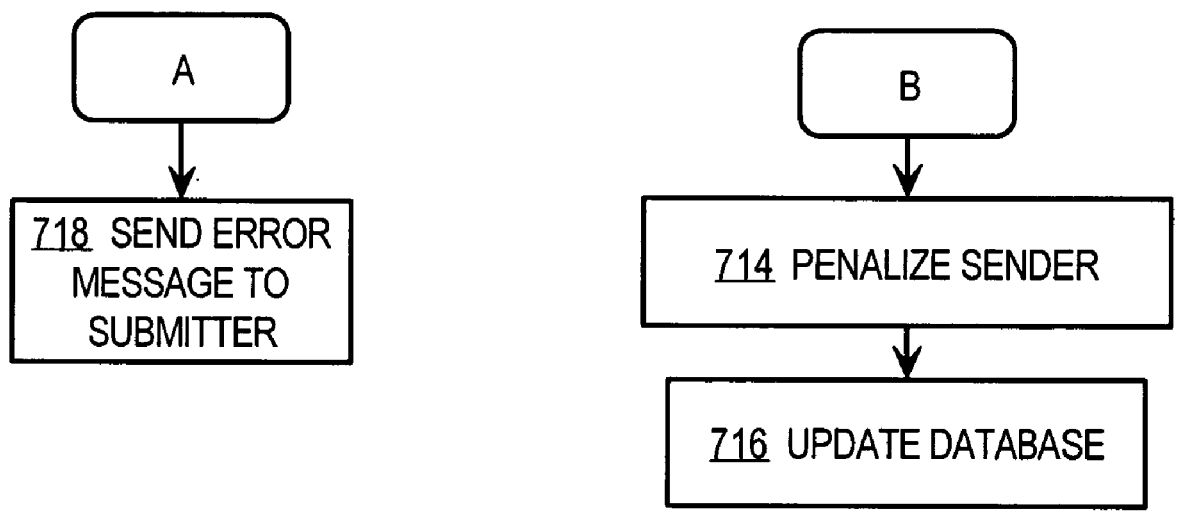
FIG. 7B is a flow diagram showing additional steps in the method of FIG. 7A.

FIG. 7A is a flow diagram of verifying a report of an unwanted message, and FIG. 7B is a flow diagram showing additional steps in the method of FIG. 7A. Such a report also may be termed a "complaint." Referring first to FIG. 7A, in general, if a Recipient determines that a message is unwanted, the Recipient forwards the message token to the Service Operator and requests the Sender to forfeit the bond. The Recipient may perform such a determination, for example, after receiving a message passed to it by a Receiver that has performed the process of FIG. 6. The Service Operator examines the token and other values to verify the request, and then determines whether to forfeit the bond.

Referring now to block 702, a report that a message was unwanted is received. In one embodiment, the report comprises a message from the Recipient to the Service Operator that includes sender ID value 404, encrypted token 406, and a request to forfeit the bond. The report or complaint also includes a network address of the Recipient, either within the complaint message or within a header of a packet that carries the message. For example, the conventional IP packet header carries the address of the sender of a packet. In response, the Service Operator decrypts the token, as shown in block 704. The Service Operator then performs a series of tests on values in the token and relating to the Submitter.

In block 706, the Service Operator determines whether the token was actually created by the original message Sender. For example, the Service Operator compares sender ID value 408 from the decrypted token to sender ID value 404. If there is a match, then the identified Sender is known to have created the encrypted token. An encryption approach for encrypting token 406 is selected so that it is impractical for a malicious Sender to create a false token, or to decrypt a token and learn the sender ID value 408 therein.

If the test of block 706 is negative, then control passes to block 718 (FIG. 7B), in which the Service Operator sends an error message to the Submitter of the forfeiture request. In this context, sending an error message may include sending an advisory message to the Submitter indicating that the bond will not be forfeited. It may also include sending a warning message to the Sender of the message and recording these actions in a log or other database.

In block 708, the Service Operator determines whether the token is unexpired. Block 708 may involve examining expiration time value 412 and comparing it to a master clock or time value. The time values may be expressed in Greenwich Mean Time, or Service Operator optionally may perform one or more time zone conversion operations. If expiration time value 412 has passed, then control passes to block 718.

Otherwise, in block 710, the Service Operator determines whether the Submitter of the forfeiture request is a valid owner of the address to which the message is directed. For example, the Service Operator examines Recipient address value 416 in the decrypted message token 406 and determines whether the Submitter owns the address. The Service Operator may determine valid ownership by comparing the recipient address value 416 to the known network address of the recipient, based on an address value in the complaint message or a header of the complaint message. In this context, determining ownership includes determining whether a party is a valid proxy for an address. Thus, the use of a recipient address identifier in token 406 of message 400 prevents a malicious user from spoofing complaints about unsolicited messages by essentially requiring a complaining party to prove that a sender identified in a complaint actually sent the message to the complaining party. For example, a malicious user could prepare software that would automatically generate a large number of identical complaints. However, if the test of block 710 determines that recipient address value 416 does not match an actual address of the recipient, then a fraudulent complaint may be suspected, and control passes to part A of FIG. 7B, which performs error processing.

In block 712, the Service Operator determines whether the bond amount for the then-current message is not already forfeited. For example, block 712 involves determining whether the bond represented by the then-current token 706 has been forfeited, by checking looking up the token based on its expiration time value and token ID value in a database of forfeited bonds that is maintained by the Service Operator. If the bond associated with the token has been forfeited previously, then control passes to block 718 (FIG. 7B).

Referring now to FIG. 7B, if all the tests of block 706, 708, 710, 712 are affirmative, then in block 714, the Sender is penalized. Any of the approaches of Section 2.6 may be used. In block 716, the Service Operator updates its database with information relating to the penalty.

The tests shown in FIG. 7 may be performed in any order. Further, a Service Operator may elect, as a matter of policy, to perform other tests.

In addition, the process of FIG. 7 may be supplemented with a dispute resolution process that addresses allegedly fraudulent reports of unwanted messages, or reports issued by allegedly fraudulent Recipients.

2.6 Penalizing Senders

Figure 8:
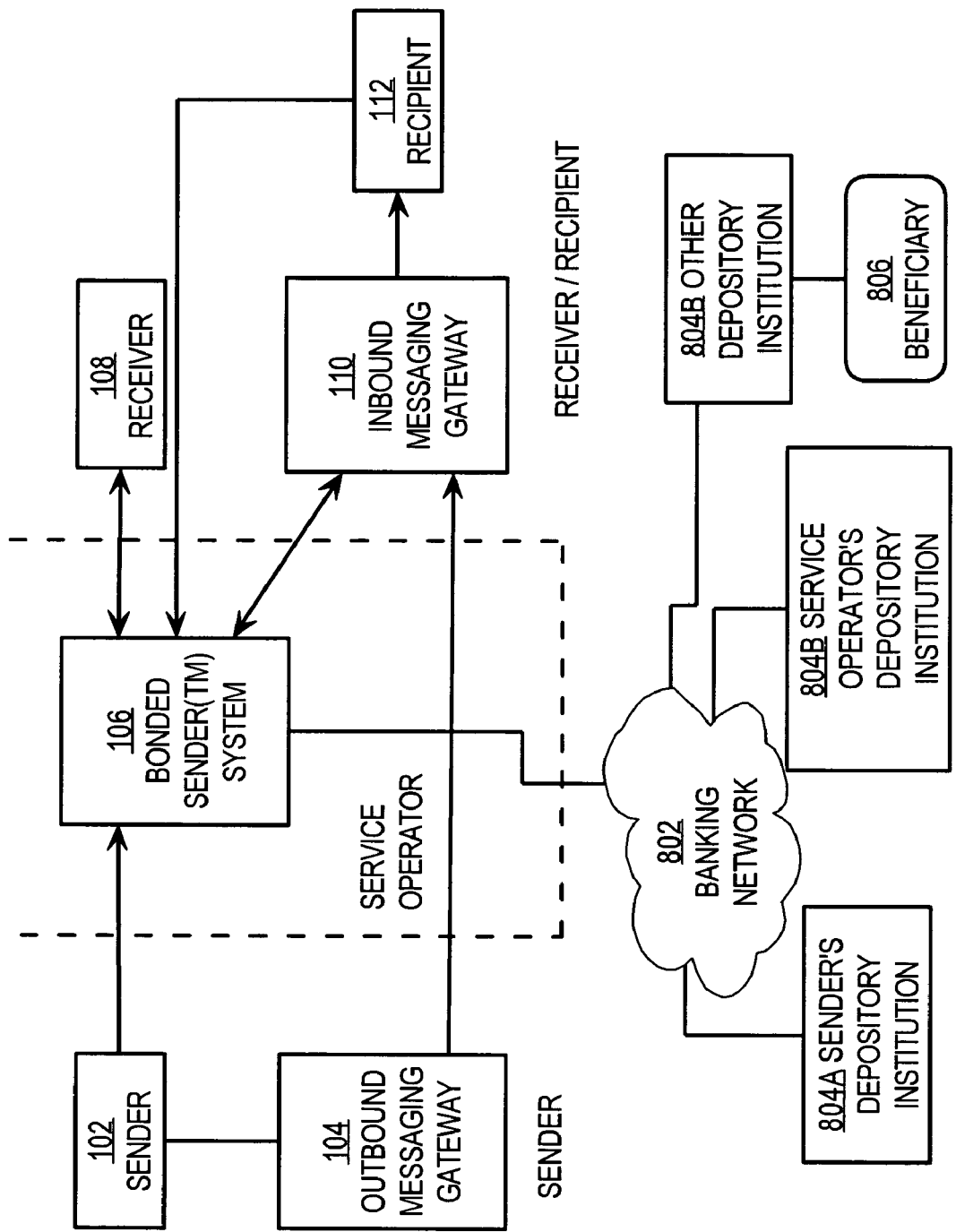
FIG. 8 is a block diagram of a banking network and related elements in relation to the system of FIG. 1A.

The Service Operator may penalize a Sender who sends a message that is designated as bonded but that constitutes "spam" based on any of several approaches. FIG. 8 is a block diagram of a banking network and related elements in relation to the system of FIG. 1A that may be used in certain approaches. The elements of FIG. 8 are not required for any particular embodiment.

Message Processing System 106 is communicatively coupled directly or indirectly to a banking network 802. One or more depository institutions, such as a Sender's depository institution 804A, Service Operator's depository institution 804B, and other depository institution 804C, are coupled to network 802. Each depository institution 804A, 804B, 804C comprises a bank, thrift, or other institution that receives and holds private funds in designated accounts, such as a securities brokerage, etc. Sender's depository institution 804A holds an account owned by a Sender; Service Operator's depository institution 804B holds an account owned by the Service Operator; and the other depository institution 804C holds one or more accounts that are owned by a Receiver, or a Recipient, or a third party beneficiary 806.

In one embodiment, penalizing a Sender involves causing the Sender to forfeit all or a portion of a bond that the Sender has posted with the Service Operator. If the Sender has posted a bond with the Service Operator, then forfeiture may comprise performing an electronic funds transfer. For example, the Service Operator causes the Sender to forfeit an amount of value equal to the bond amount that was offered by the Sender in the message token. This may involve transferring funds from an account in Service Operator's depository institution 804B, owned by the service provider and containing funds placed on deposit by the Sender, to an account at the other depository institution 804B or to a designated party.

If the Sender has not posted a bond, then penalizing the Sender may involve the Service Operator issuing an invoice to the Sender. In response, the Sender may issue, to the Service Operator, a check or draft drawn on an account in Sender's depository institution 804A. Thereafter, or concurrently, the Service Operator may transfer funds to a Receiver, Recipient, or beneficiary.

In certain embodiments, the penalty amount imposed on a particular Sender for a plurality of identical "spam" messages is capped at a specified maximum penalty value. For example, the Service Operator may penalize the Sender a maximum of $10,000, or some other specified amount, even if millions of identical "spam" messages are sent and only a few "spam" reports are received from Recipients. Alternatively, the penalty amount is tiered, such that the penalty amount increases as specified numbers of "spam" reports are received, or tiered based on the number of "spam" messages that were sent.

Penalizing a Sender also may involve determining how to split the fine among one or more parties and distributing funds to such parties, manually or using electronic funds transfers or similar mechanisms. For example, funds, monetary value, or other elements of value representing a penalty against the Sender may be transferred from the Sender, or an account associated with the Sender, to the Service Operator, to a network administrator, to the Receiver, to the Recipient, to the Receiver as a credit for the benefit of an account held at the Receiver by the Recipient (e.g., an end user account with an ISP), to a third party beneficiary such as charitable entity, etc.

2.7 Estimation Approaches

In certain embodiments, an amount of the bond that is placed in block 202 of FIG. 2A, or an amount of the fine that is reserved in block 215 of FIG. 2B, or an amount of a penalize applied to a sender at block 310 of FIG. 3, may be automatically determined using estimation approaches that take into account a number of receiver complaints that are likely to be received for the then-current sender.

Figure 10A:
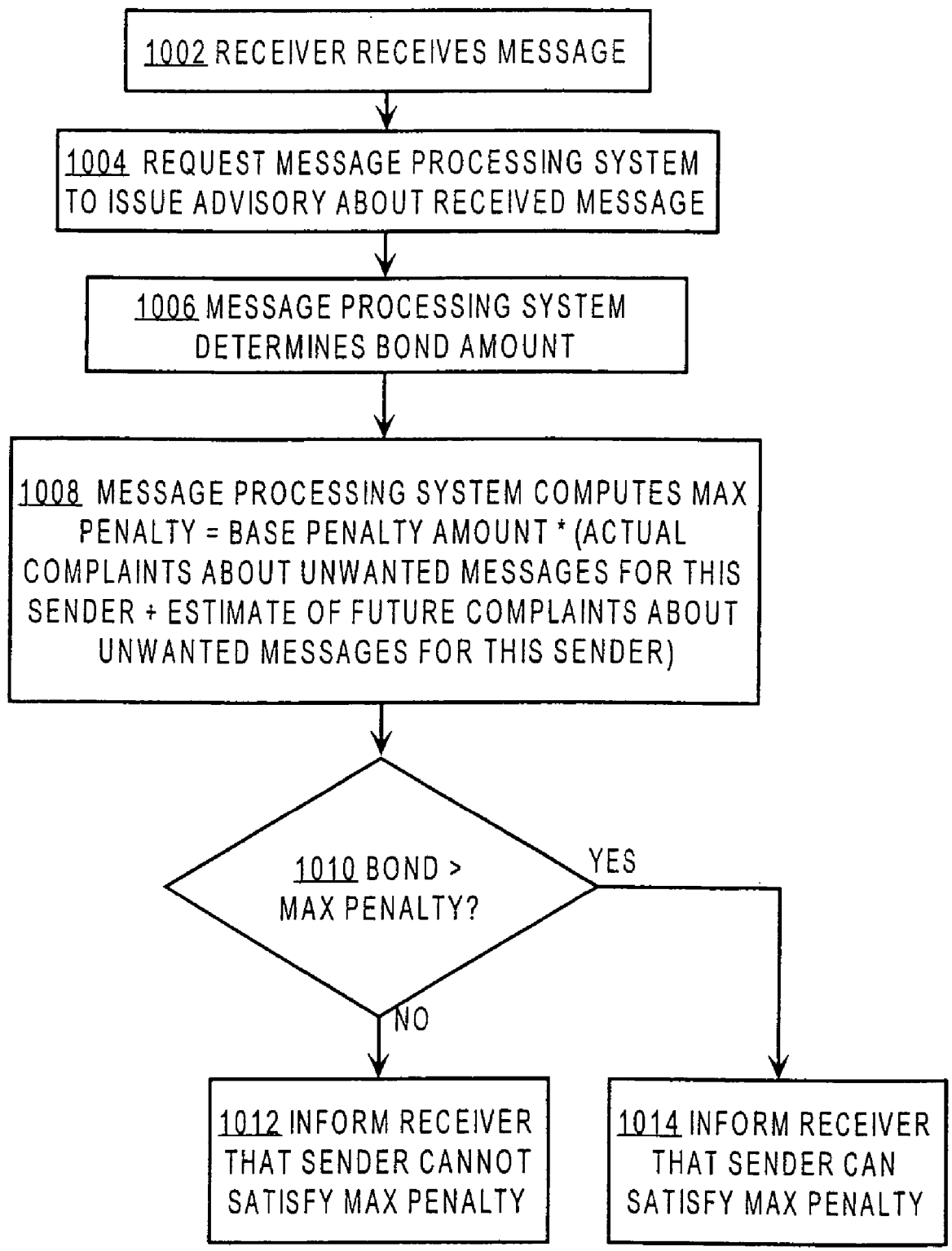
FIG. 10A is a flow diagram of a first process for messaging processing using an estimation approach.

FIG. 10A is a flow diagram of a first process for messaging processing using an estimation approach. The process of FIG. 10A may be performed by message processing system 106 of FIG. 1A in response to a query from inbound messaging gateway 110. In block 1002, a receiver such as a message gateway receives a message directed to a recipient. In block 1004, the receiver requests a message processing system to issue an advisory about the received message.

In block 1006, the message processing system determines an amount of a bond that has been offered by a sender of the message for all messages that it sends. For example, block 1006 may involve decrypting an encrypted token prepared by the sender of the message that contains a proposed bond amount. In this approach, the offered amount is a total bond amount rather than an amount for a single message.

In block 1008, the message processing system computes a maximum penalty amount that could be applied to the sender if many or all of its messages are reported as unwanted by receivers. The maximum penalty is computed as a base penalty amount multiplied by the sum of (a) a number of complaints about unsolicited messages that are actually received from senders and (b) an estimate of a number of complaints that are not yet made or never made by receivers ("un-filed complaints").

In block 1010, the message processing system 106 compares the offered bond amount from the message to the maximum penalty that was computed in block 1008. If the message processing system determines that the difference of the bond amount and the penalty amount so computed is greater than zero, then the message processing system informs the inbound messaging gateway 110 that the sender can satisfy the maximum possible penalty, i.e., that the sender remains bonded, as shown in block 1014. In response, the inbound messaging gateway 110 forwards a received message to recipient 112. Alternatively, if the difference is zero or less, then in block 1012 message processing system 106 may inform the gateway 110 that the sender could not satisfy the maximum anticipated penalty. The gateway 110 then may request message processing system 106 to penalize the sender, block forwarding of the message to the recipient 112, etc.

Figure 10B:
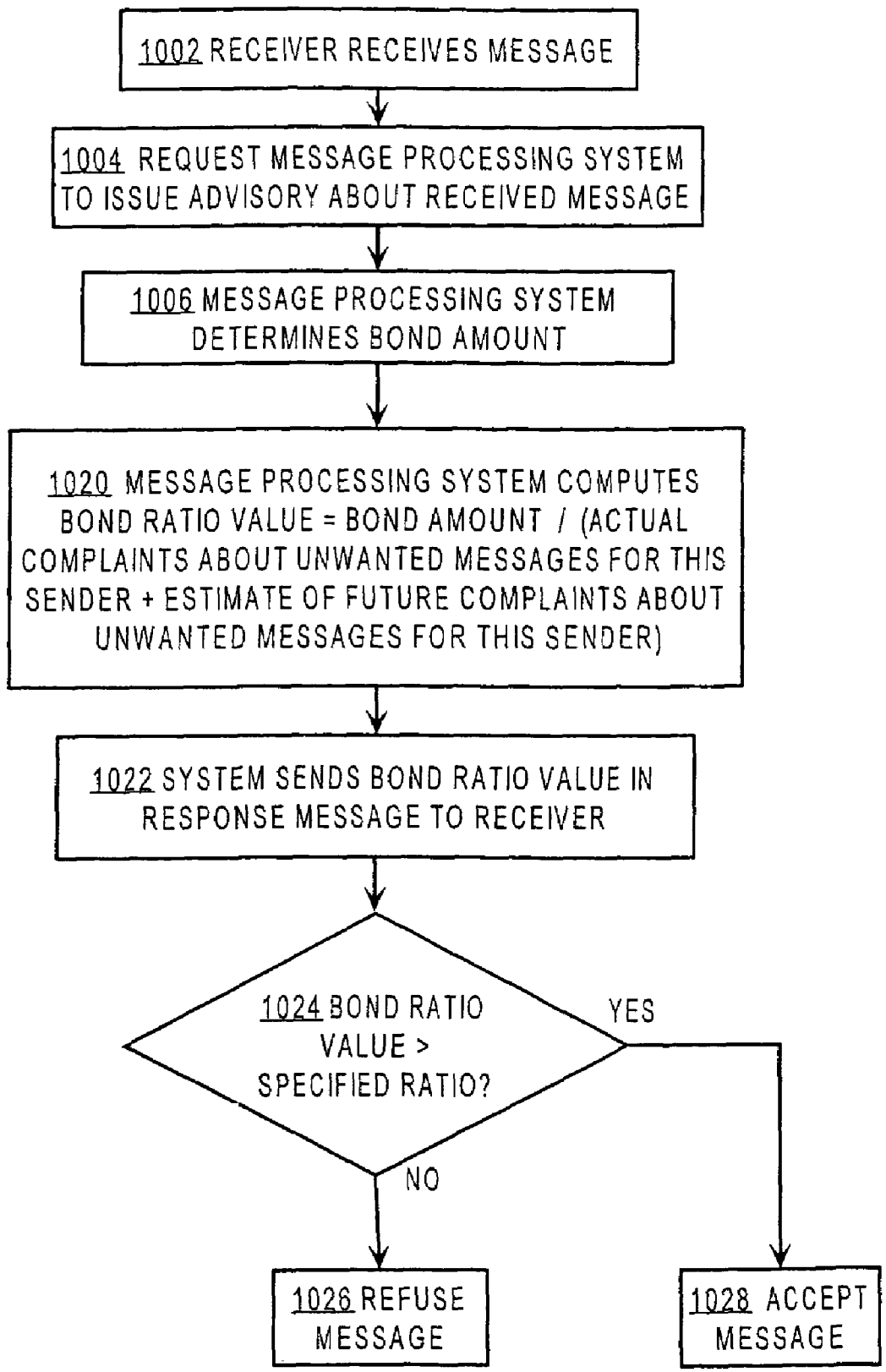
FIG. 10B is a flow diagram of a second process for messaging processing using an estimation approach.

FIG. 10B is a flow diagram of a first process for messaging processing using an estimation approach. In this approach, block 1002, 1004, and 1006 involve the same steps as in FIG. 10A. However, in block 1020, the message processing system computes a bond ratio value as the bond amount offered or posted by a sender, divided by a sum of a number of complaints about unwanted messages that are actually received from senders and an estimate of a number of complaints that are not yet filed or never filed by receivers.

Each inbound messaging gateway 110 that accesses message processing system 106 is assumed to establish and store a specified minimum bond ratio amount. At block 1022, the message processing system informs receiver, such as the inbound messaging gateway 110, of the computed bond ratio value. At block 1024, the inbound messaging gateway 110 determines whether the computed bond value is equal to or greater than the specified minimum bond ratio amount of that gateway. If so, then the gateway 110 accepts and forwards the received message to the recipient 112, at block 1028. If not, then at block 1026 the gateway may refuse the message, request message processing system 106 to penalize the sender, block forwarding of the message to the recipient 112, etc.

The bond ratio value approach provides added flexibility to receivers, because each inbound messaging gateway 110 among a number of gateways associated with different receivers can set its own specified minimum bond ratio value. For example, one ISP may require that all senders have a bond ratio value of at least 10, and another ISP could require a minimum ratio of 20. Therefore, receivers can customize, to an extent, the operation of message processing system 106.

Further, the bond ratio value approach enables a receiver to determine how a first Sender compares in relative terms to a second Sender with respect to actual complaints, rather than simply knowing whether the first Sender can withstand a particular penalty amount as in the approach of FIG. 10A. For example, a receiver could derive a rating for a particular Sender based on the bond ratio values that are determined. The bond ratio value may be viewed as a sender experience value or rating.

Still further, the bond ratio value does not incorporate a penalty amount. Thus, the use of a bond ratio value provides a way to apply a negative experience rating to a Sender, without actually requiring the Sender to post a bond in advance and without actually debiting funds from or imposing a specific financial penalty on the Sender. For example, as an alternative to reserving a fine at block 215 of FIG. 2B, a bond ratio value of the Sender is re-computed and stored. Similarly, at block 218, the bond ratio value of the Sender may be re-computed to reflect a negative experience with the Sender. In another example, penalizing a Sender at block 310 of FIG. 3 may involve re-computing and storing the bond ratio for the Sender without actually imposing a financial penalty on the Sender. The re-computation of a bond ratio also may be performed at block 520 of FIG. 5B to take into account the values of the sender, reply, and credit validation flags; or at block 610, 612 of FIG. 6; or at block 714 of FIG. 7 As the bond ratio worsens, the Sender loses the ability to send messages through gateways that are in contact with message processing system 106.

In either of these approaches, a computation of an estimate of a number of complaints that are not yet filed or never filed by receivers is performed. The computation may be performed using several mechanisms. For example, an estimate may be determined based on volume of messages sent, by selecting an estimate value from a mapping of estimate values to volume levels. Using that mechanism, a Sender who sends 1,000,000 messages in a specified window of time, e.g., 24 hours, could be assigned an estimated number of complaints of 100. Alternatively, if a Sender sends 10,000,000 messages in a 24-hour period, the message processing system 106 may assume that a 1,500 complaints will be received in the future. A specified time window is used because recipients need a certain amount of time to receive, read and evaluate received messages, so a delay of at least several hours to several days could elapse between sending a message and receiving a complaint.

In a variation of this approach, the estimated number of complaints could be scaled according to a length of the time window. For example, if the time window is 3 days, then one complaint rate might be applied to the first 24 hours, a second different rate to the second 24 hours, and a third different rate to the third 24 hours, and these three rates may be blended to arrive at an average complaint rate that is multiplied by the message volume to result in a final estimate of complaint volume.

These approaches address the potential problem of how to process a Sender that is newly bonded and immediately sends a large volume of messages. Since such a Sender has no historical actual complaint rate, better operation of message processing system 106 and better satisfaction of receivers is expected if some number of complaints is assumed or estimated for a given volume of sent messages.

Alternatively, an estimate may be provided by counting an actual number of complaints over a specified window of time, resulting in a historical complaint rate. The estimate may apply a scaling value to the historical complaint rate in order to correlate the complaint rate to the actual number of messages sent by a sender.

3.0 Implementation Mechanisms—Hardware Overview

Figure 9:
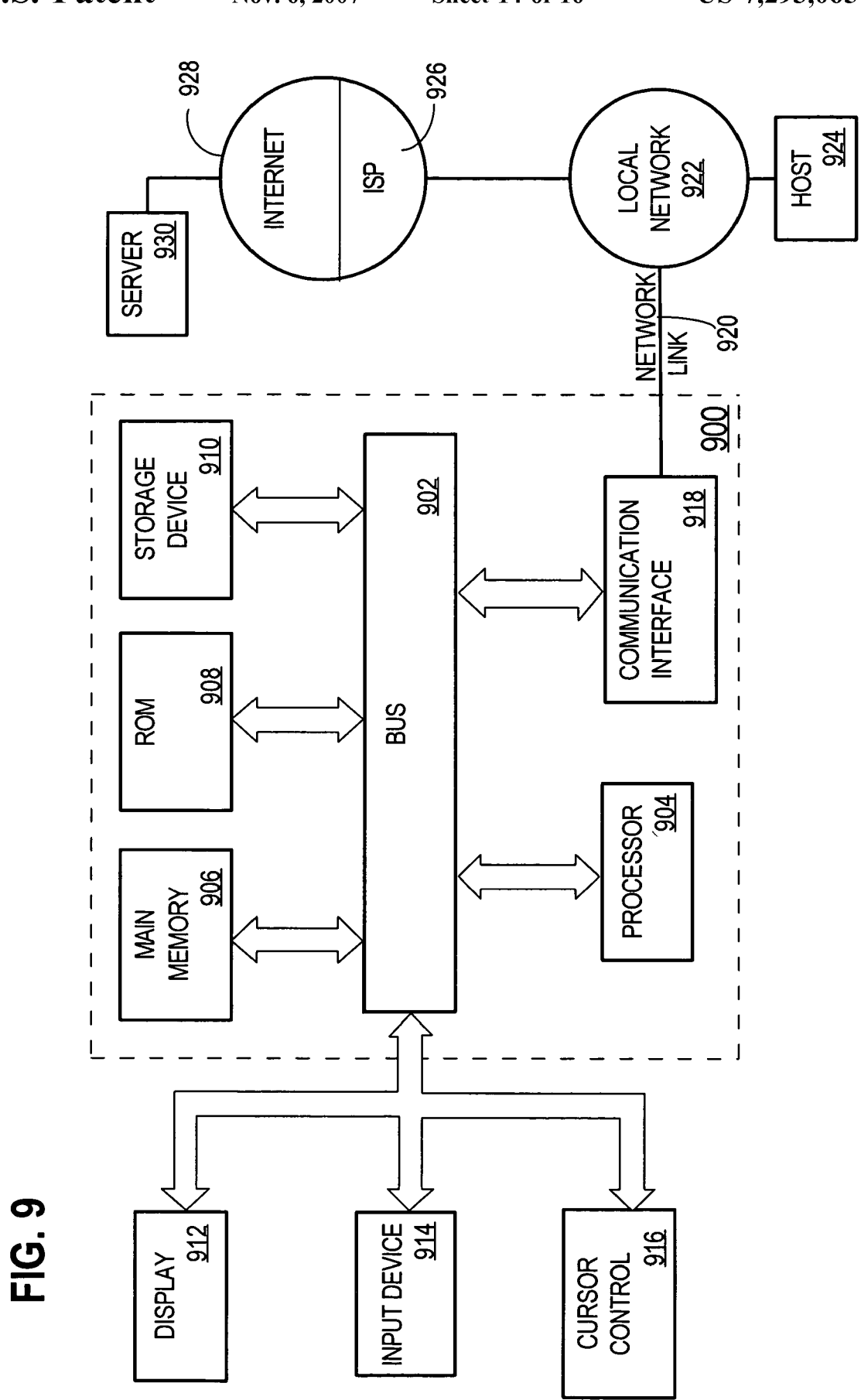
FIG. 9 is a block diagram that illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for electronic message delivery approaches. According to one embodiment of the invention, electronic message delivery approaches are provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for electronic message delivery approaches as described herein.

The received code may be executed by processor 904 as it is received, and/or stored in storage device 910, or other non-volatile storage for later execution. In this manner, computer system 900 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of facilitating transmission of a message from a sender to a receiver, comprising:
   storing sender identification information in association with a penalty that a sender is willing to incur for a first message that is unwanted by the receiver;
   receiving a query about whether a sender of a first message satisfies specified sending criteria;
   determining whether the sender satisfies the specified sending criteria; and
   sending a second message specifying whether the sender of the first message satisfies the specified sending criteria, for use by the receiver in determining whether to accept the first message;
   wherein the determining step comprises determining whether the penalty is greater than a base penalty amount multiplied by the sum of (a) a number of complaints about unsolicited messages that are actually received from the sender and (b) an estimate of a number of complaints that are not yet made or never made by the receiver and any other receiver.

2. A method as recited in claim 1, further comprising refusing to accept the first message when the penalty is not greater than the base penalty amount multiplied by the sum of (a) and (b).

3. A method of facilitating transmission of a message from a sender to a receiver, comprising:
   storing sender identification information in association with a penalty that a sender is willing to incur for a first message that is unwanted by the receiver;
   receiving a query about whether a sender of a first message satisfies specified sending criteria;
   determining whether the sender satisfies the specified sending criteria; and
   sending a second message specifying whether the sender of the first message satisfies the specified sending criteria, for use by the receiver in determining whether to accept the first message wherein the determining step comprises determining a sender experience value for the sender of the first message, wherein the sender experience value is computed as the penalty divided by a sum of a number of complaints about unwanted messages that are actually received from the sender and an estimate of a number of complaints that are not yet filed or never filed by the receiver and any other receivers.

4. A method as recited in claim 3, further comprising refusing to accept the first message when the sender experience value for the sender of the first message is less than a specified minimum sender experience value.

5. A method of authorizing transmission of a first message from a sender to a receiver, comprising:
   storing sender identification information in association with a penalty value identifying an amount of monetary value that a sender is willing to pay for a specified message that is sent by the sender to the receiver and that is unwanted by the receiver;
   receiving a query about whether a first message from the sender is subject to a penalty offered by the sender;
   determining whether the first message is subject to a penalty offered by the sender;
   sending a second message specifying whether the first message is subject to a penalty offered by the sender;
   receiving a third message, from the receiver, indicating that the first message is unwanted; and
   in response to receiving the third message, determining a sender experience value for the sender of the first message, wherein the sender experience value is computed as the amount of monetary value divided by a sum of a number of complaints about unwanted messages that are actually received from the sender and an estimate of a number of complaints that are not yet filed or never filed by the receiver and any other receivers.

6. A method as recited in claim 5, further comprising the step of receiving a third message indicating that the first message is unwanted.

7. A message as recited in claim 6, further comprising verifying that the third message is legitimate based on comparing a source network address of the third message to a recipient address in the first message.

8. A method as recited in claim 5, further comprising the steps of: receiving a third message, from the receiver, indicating that the first message is unwanted; in response to receiving the third message, transferring money from the sender's account.

9. A method as recited in claim 5, further comprising the steps of: receiving a third message, from the receiver, indicating that the first message is unwanted; in response to receiving the third message, transferring value from the sender, wherein the value transferred from the sender is equal to the penalty value.

10. A method as recited in claim 5, further comprising the steps of: after sending the second message, receiving a request to reserve an amount of monetary value equal to the penalty value; in response to receiving the reservation request, storing a reserved penalty value in association with the sender identification data; receiving a third message, from the receiver, indicating that the first message is unwanted; in response to receiving the third message, transferring value from the sender.

11. A method as recited in claim 5, further comprising the steps of: sending the penalty value as part of the second message; receiving a third message, from the receiver, indicating that the first message is unwanted; in response to receiving the third message, transferring value from the sender.

12. A method as recited in claim 5, wherein the first message is an electronic mail message.

13. A method as recited in claim 5, wherein the first message is a telephone message.

14. A method as recited in claim 5, wherein the first message is an electronic mail message, and wherein the query is received from an electronic mail service provider.

15. A method as recited in claim 5, wherein the first message is a telephone message, and wherein the query is received from a telephone network service provider.

16. A method as recited in claim 5, wherein the storing step comprises the step of storing sender identification information with multiple penalty values identifying a plurality of different amounts of monetary value that a sender is willing to pay for a message that is sent by the sender to receivers and that is unwanted by the receivers, wherein each of the plurality of penalty values is associated with one of a plurality of receivers.

17. A method as recited in claim 5, wherein the storing step comprises the step of storing sender identification information in association with a plurality of penalty values identifying a plurality of different amounts of monetary value that a sender is willing to pay for a message that is sent by the sender to receivers and that is unwanted by the receivers, wherein each of the plurality of penalty values is associated with one of a plurality of categories of receivers.

18. A method as recited in claim 5, wherein the storing step comprises the step of storing sender identification information in association with a plurality of penalty values identifying a plurality of different amounts of monetary value that a sender is willing to pay for a message that is sent by the sender to a receiver and that is unwanted by the receiver, wherein each of the plurality of penalty values is associated with one of a plurality of categories of messages.

19. A method as recited in claim 5, wherein the storing step comprises the step of storing sender identification information in association with a penalty value identifying a maximum amount of monetary value that a sender is willing to pay for a message that is sent by the sender to a receiver and that is unwanted by the receiver, and further comprising the steps of:
receiving a third message, from the receiver, indicating that the first message is unwanted; in response to receiving the third message, selecting a value amount that is less than or equal to the penalty value, and transferring the selected value amount from the sender.

20. A method as recited in claim 5, further comprising the steps of: receiving a third message, from the receiver, indicating that the first message is unwanted; in response to receiving the third message, transferring value from the sender, including transferring a portion of the value to the recipient.

21. A method for processing an electronic message, comprising:
receiving a first message from a sender that is sent to an intended recipient;
requesting a service operator to determine whether the sender of the first message satisfies specified sending criteria;
receiving a second message from the service operator indicating whether the sender satisfies the specified sending criteria;
forwarding the first message to the intended recipient only when the second message indicates that the sender of the first message satisfies the specified sending criteria;
wherein the second message indicates whether, for the sender, an amount of monetary value that the sender has agreed to forfeit is greater than a penalty that is computed as a base penalty amount multiplied by the sum of (a) a number of complaints about unwanted messages that are actually received from the sender and (b) an estimate of a number of complaints that are not yet made or never made by the receiver and any other receiver.

22. A method as recited in claim 21, further comprising forwarding the first message only when the amount of monetary value is greater than the penalty.

23. A method for processing an electronic message. comprising:
receiving a first message from a sender that is sent to an intended recipient;
requesting a service operator to determine whether the sender of the first message satisfies specified sending criteria;
receiving a second message from the service operator indicating whether the sender satisfies the specified sending criteria;
forwarding the first message to the intended recipient only when the second message indicates that the sender of the first message satisfies the specified sending criteria;
wherein the second message includes a sender experience value for the sender of the first message, wherein the sender experience value is computed as the amount of monetary value divided by a sum of a number of complaints about unwanted messages that are actually received from the sender and an estimate of a number of complaints that are not yet filed or never filed by the receiver and any other receivers.

24. A method as recited in claim 23, further comprising forwarding the first message only when the sender experience value for the sender of the first message is greater than or equal to a specified minimum sender experience value.

25. A method as recited in claims 21 or 23, wherein the second message includes a penalty value identifying a monetary penalty that the sender is willing to pay if the recipient indicates that the first message is unwanted.

26. A method as recited in claims 21 or 23, wherein the second message includes a penalty value identifying a monetary penalty that the sender is willing to pay if the recipient indicates that the first message is unwanted, and wherein the requesting step includes requesting the service operator to determine whether the first message is bonded by comparing the penalty value to a specified threshold.

27. A method as recited in claims 21 or 23, wherein the second message includes a penalty value identifying a monetary penalty that the sender is willing to pay if the recipient indicates that the first message is unwanted, and wherein the requesting step includes requesting the service operator to determine whether the first message is bonded by comparing the penalty value to a specified threshold, and wherein the specified threshold is selected based on an identity of the intended recipient.

28. A method of managing electronic messages sent from a sender to a recipient, comprising:
receiving agreement from a message sender to pay a penalty, wherein the penalty is based upon a determination that one or more electronic messages sent by the message sender to message recipients are unwanted by the message recipients;
receiving one or more indications that a message sent by the message sender is unwanted by one or more of the message recipients;
creating and storing one or more records of the indications;
charging the message sender a penalty based upon the number of indications that are received; and
informing the recipient whether, for the sender, an amount of monetary value that the sender has agreed to forfeit is greater than a base penalty amount multiplied by the sum of (a) a number of complaints about unwanted messages that are actually received from the sender and (b) an estimate of a number of complaints that are not yet made or never made by the receiver and any other receiver.

29. A method of managing electronic messages sent from a sender to a recipient, comprising:
receiving agreement from a message sender to pay a penalty, wherein the penalty is based upon a determination that one or more electronic messages sent by the message sender to message recipients are unwanted by the message recipients;
receiving one or more indications that a message sent by the message sender is unwanted by one or more of the message recipients;
creating and storing one or more records of the indications;
charging the message sender a penalty based upon the number of indications that are received; and
further comprising informing the recipient of a a sender experience value for the sender of the first message, wherein the sender experience value is computed as the amount of monetary value divided by a sum of a number of complaints about unwanted messages that are actually received from the sender and an estimate of a number of complaints that are not yet filed or never filed by the receiver and any other receivers.

30. A method as recited in claims 28 or 29, wherein the electronic messages are e-mail messages.

31. A method as recited in claims 28 or 29, wherein the electronic messages are telephone calls.

32. A method as recited in claims 28 or 29, wherein the electronic messages are pager messages.

33. A method as recited in claims 28 or 29, wherein the penalty is determined by multiplying the number of indications by a specified fine amount.

34. A method as recited in claims 28 or 29, wherein the penalty is limited to a specified maximum penalty amount for all indications that are received in a specified period.

35. A method as recited in claims 28 or 29, wherein the penalty is determined by multiplying the number of indications received by a penalty value that is selected from among one of a plurality of penalty values based on the number of indications that are received.

36. A method as recited in claims 28 or 29, wherein the penalty is a fixed amount per indication that exceeds an allowed complaint rate.

37. A method of penalizing a sender of unsolicited messages directed through a receiver to a recipient, comprising the steps of:
receiving an encrypted token that the sender provided in the message;
determining, based on values in the encrypted token, whether the sender actually created the token;
determining whether the sender has sufficient credit to suffer a penalty if the message is unwanted by the recipient;
sending a response message identifying whether the sender actually created the token and whether the sender has sufficient credit;
receiving information specifying that the message is unwanted; and
determining a sender experience value for the sender of the message, wherein the sender experience value is computed as the amount of monetary value divided by a sum of a number of complaints about unwanted messages that are actually received from the sender and an estimate of a number of complaints that are not yet filed or never filed by the receiver and any other receivers.

38. A method as recited in claim 37, further comprising determining whether a recipient address value in the encrypted token matches a known network address of the recipient.

39. A method as recited in claim 37, wherein the encrypted token includes a sender identifier, token identifier, and penalty amount offered by the sender.

40. A method as recited in claim 37, wherein the encrypted token includes a sender identifier, token identifier, penalty amount offered by the sender, and expiration time value.

41. A method as recited in claim 37, wherein values in the encrypted token comprise a sender identifier, penalty amount offered by the sender, and recipient address.

42. A method as recited in claim 37, further comprising the steps of determining whether the encrypted token has been processed before, and generating a value in the response message that indicates whether the encrypted token has been processed before.

43. A method as recited in claim 37, wherein values in the encrypted token comprise an expiration time value, and further comprising the steps of: determining whether the expiration time value has passed; accepting the message only when the expiration time value has not passed.

44. A method as recited in claim 37, wherein values in the encrypted token comprise an penalty amount offered by the sender, and further comprising the steps of:
determining whether the penalty amount offered by the sender is greater than a specified minimum penalty value; accepting the message only when the penalty amount offered by the sender is greater than a specified minimum penalty value.

45. A method as recited in claim 37, wherein values in the encrypted token comprise a recipient address value, and further comprising the steps of: determining whether the recipient address value matches a destination address value in a header of the message; accepting the message only when the recipient address value matches a destination address value in a header of the message.

46. A method as recited in claim 37, further comprising the steps of accepting the message only when the sender actually created the token.

47. A method as recited in claim 37, further comprising the steps of penalizing the sender only when a complaint message containing the token is determined to have actually originated from a recipient of the first message.

48. A method as recited inclaim 37, further comprising the steps of accepting the message only when the sender has sufficient credit to suffer a penalty if the message is unwanted by the recipient.

49. A method as recited in claim 37, further comprising the steps of: receiving the encrypted token with the information specifying that the message is unwanted; and
penalizing the sender only upon determining, based on a sender identifier in the token, that the sender actually created the token.

50. A method as recited in claim 37, further comprising the steps of: receiving the encrypted token with the information specifying that the message is unwanted; and
penalizing the sender only upon determining, based on an expiration time value in the token, that the token is unexpired.

51. A method as recited in claim 37, further comprising the steps of: receiving the encrypted token with the information specifying that the message is unwanted; and
penalizing the sender only upon determining, based on the token, that the sender has not previously paid a penalty for other messages associated with the same token.

52. A method as recited in claim 37, further comprising the steps of penalizing the sender only upon determining, based on a recipient address in the token, that the submitter of the information specifying that the message is unwanted actually owns or is associated with the recipient address.

53. A method as recited in claim 37, wherein penalizing the sender comprises a service operator issuing an invoice to the sender for payment of a fine.

54. A method as recited in claim 37, wherein penalizing the sender comprises a service operator transferring funds previously provided by the sender from a first account associated with the service operator to a second account associated with the receiver, the recipient, or a beneficiary.

55. A computer-readable storage medium carrying one or more sequences of instructions for delivering electronic messages, which instructions, when executed by one or more processors, cause the one or more processors to carry out the steps of any of claims 1, 3, 5, 21, 23, 28, 29 and 37.

56. An apparatus for delivering electronic messages, comprising: a network interface that is coupled to the data network for receiving one or more packet flows therefrom; a processor; one or more stored sequences of instructions which, when executed by the processor, cause the processor to carry out the steps of any of claims 1, 3, 5, 21, 23, 28, 29 and 37.

57. A method as recited in claim 1, wherein the penalty comprises money, resources, goods, services, or promises.

58. A method as recited in claim 5, further comprising the steps of: receiving a third message, from the receiver, indicating that the first message is unwanted; determining whether the third message exceeds an allowed complaint rate associated with the sender; and debiting value from the sender when the complaint rate is exceeded.

* * * * *